US012587592B2

(12) United States Patent
Liu et al.

(10) Patent No.: US 12,587,592 B2
(45) Date of Patent: Mar. 24, 2026

(54) ENHANCED EDGE APPLICATION RELOCATION

(71) Applicant: InterDigital Patent Holdings Inc., Wilmington, DE (US)

(72) Inventors: Lu Liu, Conshohocken, PA (US); Dale Seed, Allentown, PA (US); Xu Li, Plainsboro, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/258,444

(22) PCT Filed: Dec. 21, 2021

(86) PCT No.: PCT/US2021/064595
§ 371 (c)(1),
(2) Date: Jun. 20, 2023

(87) PCT Pub. No.: WO2022/140375
PCT Pub. Date: Jun. 30, 2022

(65) Prior Publication Data
US 2024/0305693 A1　　Sep. 12, 2024

Related U.S. Application Data

(60) Provisional application No. 63/128,238, filed on Dec. 21, 2020.

(51) Int. Cl.
*G06F 15/16* (2006.01)
*H04L 67/00* (2022.01)

(52) U.S. Cl.
CPC ................................... *H04L 67/34* (2013.01)

(58) Field of Classification Search
CPC ...................................................... H04L 67/34
See application file for complete search history.

(56) References Cited

U.S. PATENT DOCUMENTS

| 10,841,974 B1 * | 11/2020 | Young | ................... | H04W 76/30 |
| 2021/0058489 A1 * | 2/2021 | Kim | ....................... | H04W 4/50 |

OTHER PUBLICATIONS

Convida Wireless LLC et al., "Solutions 20, 21 clean-up and conclusion to Key Issue#9 Preserving Service Continuity", 3GPP TSG-SA WG6 Meeting #34, S6-192340, Nov. 2019, pp. 12.
Huawei et al., "Edge service continuity procedure", 3GPP TSG-SA WG6 Meeting #38-e, S6-201139, Jul. 2020, pp. 3.
3rd Generation Partnership Project (3GPP), "Architecture for enabling Edge Applications, (Release 17)", Technical Specification Group Services and System Aspects, 3GPP TS 23.558 V1.1.0, Oct. 2020, 121 pages.

* cited by examiner

*Primary Examiner* — Padma Mundur
(74) *Attorney, Agent, or Firm* — Flaster Greenberg, P.C.

(57) ABSTRACT

Disclosed herein is service continuity assistance (SCA) functionality that may assist in the relocation of edge application server instance between different edge nodes in the system. The procedures may include: 1) edge application relocation target prediction and selection; 2) defining and generating relocation trigger; 3) proactive relocation; or 4) multi-application and multi-UE joint relocation.

13 Claims, 21 Drawing Sheets

ENHANCED EDGE APPLICATION RELOCATION

CROSS-REFERENCE TO RELATED APPLICATIONS

This application is the National Stage Application of International Patent Application No. PCT/US2021/064595, filed Dec. 21, 2021, which claims the benefit of U.S. Provisional Patent Application No. 63/128,238, filed on Dec. 21, 2020, entitled "Enhanced Edge Application Relocation," the contents of which are hereby incorporated by reference herein.

BACKGROUND

Machine-To-Machine (M2M), Internet-of-Things (IoT), and Web-of-Things (WoT) network deployments may encompass a wide variety of servers, gateways, and devices, such as those described in, for example: Technical Specification Group Services and System Aspects—Architecture for enabling Edge Applications, 3GPP TS 23.558, v1.1.0; Study on Application Architecture for Enabling Edge Applications, 3GPP TR 23.758, v1.0.0; oneM2M 3GPP Interworking, oneM2M TS-0026, v4.2.0; and Open Mobile Alliance (OMA) Lightweight Machine-to-Machine protocol LWM2M, v 1.1; 3GPP Application layer support for Vehicle-to-Everything (V2X) services, 3GPP TS 23.286 v16.1.0; or 3GPP Study on enhancements to application layer support for V2X services, 3GPP TR 23.764, v0.2.0; 3GPP.

This background information is provided to reveal information believed by the applicant to be of possible relevance. No admission is necessarily intended, nor should be construed, that any of the preceding information constitutes prior art.

SUMMARY

Disclosed herein are methods, systems, and devices that may enhance edge application relocation. An edge application client hosted on a UE that is communicating with an edge application server hosted on an edge node may be triggered to switch from the currently serving edge node to another due to the UE's mobility or dynamic resource allocations on the edge nodes. To ensure the service continuity, the corresponding edge application server hosted on the edge node may need to be relocated from the currently serving edge node to a target edge node. Particularly, the edge application server instance may be relocated to or instantiated on the target edge node. In addition, any edge application context that is maintained by the edge application server will be transferred from the currently serving node to the target edge node. Correspondingly, the edge application clients hosted on the UE are redirected to communicate with the edge application server instance hosted on the target edge node.

The existing service continuity support defined for edge application relocation lacks the capability of timely or accurately determining the trigger for relocation, selecting the target node for relocation, predicting the timing of relocation, or coordinating the relocations of multiple applications on the same UE or multiple UEs.

Herein, Service Continuity Assistance (SCA) functionality is disclosed to enable proactive and efficient edge application relocation with the following features: 1) Relocation target prediction and selection; 2) Defining, generating, or monitoring relocation trigger; 3) Relocation timing prediction and proactive relocation with pre-relocation; or 4) Multi-application and multi-UE joint relocation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

3GPP SA6 Application Architecture for Enabling Edge Applications

Edge computing is a network architecture concept that enables cloud computing capabilities and service environments to be deployed at the edge of the cellular network.

US 12,587,592 B2

3

Figure 1:
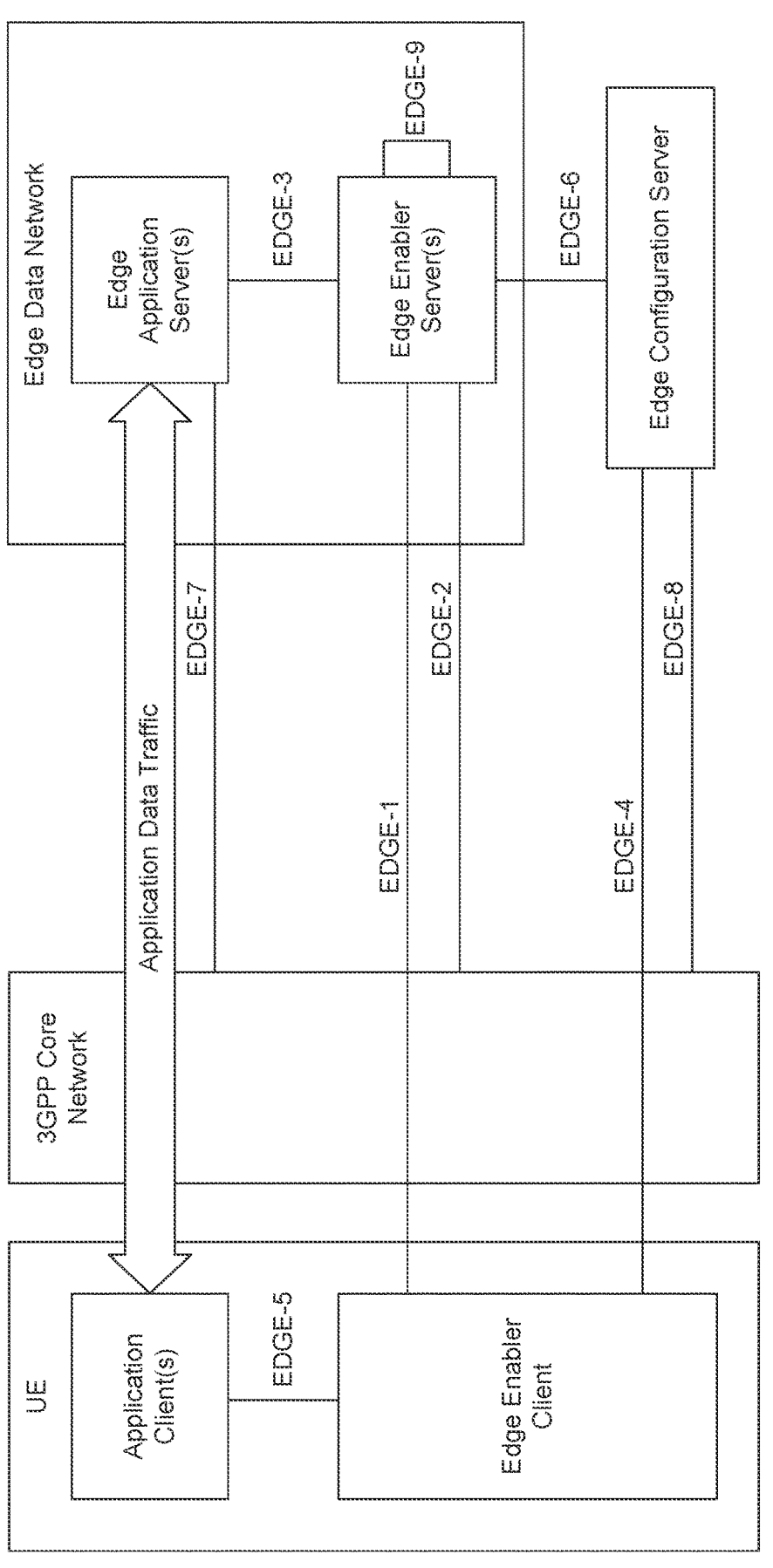
FIG. 1 illustrates an exemplary Application architecture for enabling edge applications.

FIG. 1 shows the application architecture for enabling edge application defined by 3GPP SA6 (Study on Application Architecture for enabling Edge Applications).

The major functional entities and reference points of the application architecture are described in the following.

Edge Enabler Server (EES): provides supporting functions needed for Edge Application Servers to run in an Edge Data Network, such as provisioning of configuration information to enable the exchange of application data traffic with the EAS, and providing information related to the EAS to the EEC.

Edge Enabler Client (EEC): provides supporting functions needed for Application Client(s), such as retrieval and provisioning of configuration information to enable the exchange of application data traffic with the EAS, and discovery of EASs available in the EDN.

Edge Data Network Configuration Server: provides supporting functions needed for the UE to connect with an EES, such as provisioning of EDN configuration information to the EEC.

EDGE-1: supporting interactions related to enabling edge computing, between the EES and EEC, such as retrieval and provisioning of configuration information for the UE, and discovery of EASs available in the EDN.

EDGE-2: supporting interactions related to Edge Enabler Layer, between the EES and the 3GPP Network, such as access to 3GPP network functions and APIs for retrieval of network capability information.

EDGE-3: supporting interactions related to Edge Enabler Layer, between the EES and EAS, such as registration of EASs with availability information, and providing access to network capability information.

EDGE-4: supporting interactions related to Edge Enabler Layer, between the Edge Data Network Configuration Server and the EEC, such as provisioning of EDN configuration information to the EEC in the UE.

EDGE-5: supporting interactions between Application Client(s) and the EEC in the UE, such as obtaining information about EASs that Application Client require to connect, and notifications about events related to the connection between Application Clients and their corresponding EASs.

EDGE-6: supporting interactions related to Edge Enabler Layer, between the Edge Data Network Configuration Server and the EES, such as registration of EES information to the Edge Enabler Network Configuration Server.

EDGE-9: enables interactions between two Edge Enabler Servers within the same or different EDNs.

Service Continuity

3GPP SA6 has disclosed support for service continuity in edge data networks in 3GPP TS 23.558, v1.1.0. Due to a UE's mobility or other non-mobility event, a different edge node can be more suitable for serving the application client in the UE, which requires the support to maintain the continuity of the service. Several features that support service continuity for application clients in the UE to minimize service interruption while replacing the serving (or source) edge node have been disclosed and defined in 3GPP SA6.

Generally, the source edge node is associated with application context, which is to be transferred to a target edge node to support service continuity. The capabilities for supporting service continuity may consider various application layer scenarios, such as: UE mobility, including predictive or expected UE mobility; overload situations in the source edge node; or maintenance aspects for graceful shutdown of edge application server.

To support application context relocation, the following entities have been identified: detection entity, decision-making entity, or execution entity.

Detection entity: Detects the need of application context relocation, such as UE's location, and indicates this need to the decision-making entity that determines if the application relocation is required. The detection role can be performed on entities at the UE side or at the edge node.

Decision-making entity: Decides whether the application context relocation is required and instructs the execution entity to perform the relocation.

Execution entity: Executes application context relocation as and when instructed by the decision-making entity.

For supporting service continuity at the application layer, the edge node may provide the following capabilities: 1) provide notifications of service continuity related events; 2) fetch the target edge node and edge application server (may be done by utilizing the capability provided by the configuration server); or 3) application context relocation from a source edge node to a target edge node.

Application context relocation is determined when detecting one of the following events: the UE moves outside the service area; the UE receives a PDU session modification command; or the UE is notified of the existence and availability of new IPv6 prefix.

After successful application context relocation, the source edge node is informed of the context relocation by the edge application server.

In general, a number of steps are required in order to perform the application context relocation procedure. The potential roles of an edge enablement layer in the application context relocation procedure may include: 1) providing detection events; 2) selecting the target edge node (and application server); or 3) supporting the transfer of the application context from the source edge node (and application server) to the target edge node (and application server).

Figure 2:
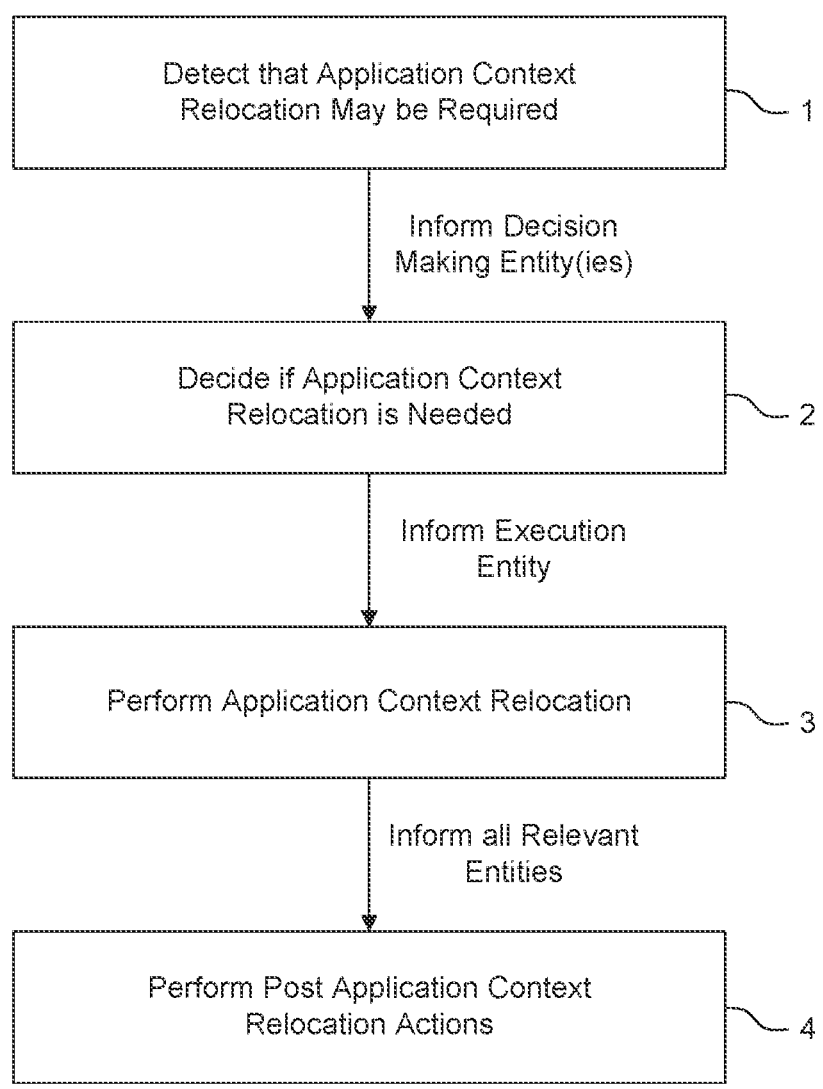
FIG. 2 illustrates an exemplary high-level overview of application context relocation procedure.
Figure 3:
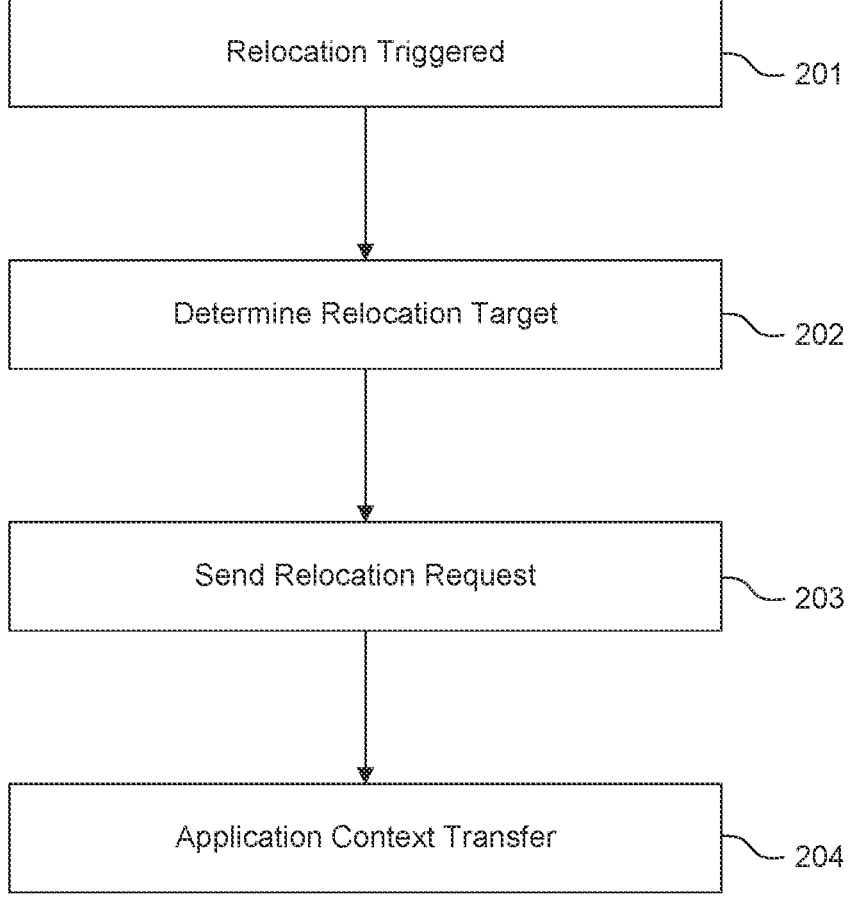
FIG. 3 illustrates an exemplary existing Edge Application Relocation Procedure.

A high-level overview of application context relocation is illustrated in FIG. 2. Problem An example of the conventional procedure defined to support service continuity and edge application server relocation is shown in FIG. 3. After the relocation is triggered (at step 201), the target EAS for relocation is determined (at step 202) and its information is retrieved by the EAS hosted on the serving/source edge node. The EAS (or a service entity) at the serving edge node further sends a request (at step 203) to the target EAS, and the application context relocation (at step 204) is performed between the serving and target edge nodes and the corresponding EASs.

Relocation Target Selection: In the conventional functionalities that support service continuity, it is not clearly defined what is the criteria to select a target edge node for relocation. Moreover, the target edge node is selected when the relocation is triggered, which may introduce extra delay for the relocation since the source edge node and the UE/application client may need to obtain information of the target edge node and establish connection with the target during the relocation process. If the relocation target could be predicted and determined ahead of the relocation, then it is possible to reduce the delay by performing these procedures proactively. However, in some cases, if the relocation target cannot be determined ahead of time, then proper procedures may be needed to predict the potential targets for relocation and perform proactive relocation without introducing too much overhead to the system.

Relocation Trigger: Triggers defined for application relocation are limited to certain events such as the location related events or edge server overloading. Although these events could indicate a relocation is required, such indications may not be able to accurately or timely reflect the need for relocation. For example, the event of "UE moving out of the service area" could trigger an application relocation. However, by the time the UE moves out of the service area, the quality of service at the application client may have already suffered certain level of degradation, and the service interruption introduced by the relocation may further negatively impact the service quality. In another example, the overloading of the current serving edge node may trigger a relocation. However, if the other available edge nodes are not in close proximity to the UE, then switching the serving edge node does not necessarily result in better service quality. The existing relocation trigger definitions usually rely on an event that could only indirectly reflect the service quality of the application client, thus may lack the accuracy or timeliness in indicating the need or timing of relocation. It would be preferred that a more accurate indicator could be defined as a timely trigger for relocation.

Relocation Timing: In the conventional application relocation process, most of the procedure for information exchange is performed after the relocation is triggered. With proactively selected or predicted relocation target(s) and a better-defined relocation trigger, it would be possible to predict the timing of the relocation, and proactively perform the relocation before it is triggered to minimize the service interruption or possible downtime caused by the relocation.

Coordination among Applications and UEs: Applications on the same UE or multiple UEs in the same area may share the same timing or target for the application relocation. Being unaware of the other application(s) that are performing a similar relocation may lead to redundant messaging between the source and target edge nodes. Furthermore, performing these relocations almost all at once may result in congestion in the communication network or overloading of the target edge node. Coordination among the relocations may be required to support such scenarios.

Disclosed herein is service continuity assistance (SCA) functionality that may assist in the relocation of edge application server instance between different edge nodes in the system. The procedures may include: 1) Edge application relocation target prediction and selection; 2) Defining and generating relocation trigger; 3) Proactive relocation; or 4) Multi-application or multi-UE joint relocation.
Approaches In view of the aforementioned, the following approaches (e.g., functions) are disclosed herein. Methods, systems, and apparatuses, among other things, as described herein may provide for maintaining a neighbor list for an edge node consisting of information of the other edge nodes with which an edge application server relocation could be performed; determining that there is a potential relocation for an edge application server; collecting information related to the potential relocation; determining the type of the potential relocation; based on the relocation event type, selecting one or more candidate edge nodes as the relocation target; defining relocation trigger criteria or pre-relocation operations based on the relocation event type, the information of the application client and EAS, or the status of candidate edge nodes; obtaining information of the candidate edge nodes, based on which, trimming the list of candidates; monitoring the requirements of the application client, the status of the edge application server or candidate edge nodes to detect the relocation trigger; sending a proactive relocation request to each of the candidate edge nodes; performing application relocation when triggered; or notifying candidate nodes that are not selected as the relocation target.

A first approach is associated with maintaining a neighbor list for an edge node consisting of information of the other edge nodes with which an edge application server relocation could be performed. The information of a neighbor edge node may include its accessibility, capability, type of relocation associated with the node, or whether the node is involved in any ongoing or potential relocation.

A second approach is associated with determining that there is a potential relocation for an edge application server. The decision may be based on receiving a request from the application server, the instantiation of an edge application server that requires mobility support, or the status of the current serving edge node.

A third approach is associated with collecting information related to the potential relocation. The information may include application information, status of the serving edge node, or status of the application client.

A fourth approach is associated with determining the type of the potential relocation. The type of relocation may include UE mobility, edge node load balancing, edge node availability, change of application requirement, or coordination among multiple UEs, among other things. The decision may be made based on examining the information of the application, status of the edge nodes, or the requirements of the edge application.

A fifth approach may be associated with selecting one or more candidate edge nodes as the relocation target based on the relocation event type. If the relocation is UE mobility based and the UE's route is known, the potential target may be selected as the edge node that is the closest to the predicted location of UE. If the relocation is UE mobility based and the UE's route is unknown, the potential targets may be selected as the neighboring edge nodes of the current serving edge node. If the relocation is load balancing based, the potential targets may be selected as the edge node(s) that are co-located with the current serving edge node.

A sixth approach is associated with defining relocation trigger criteria and pre-relocation operations based on the relocation event type, the information of the application client and EAS, and the status of candidate edge nodes. The trigger may be based on comparing the performance or quality of service provided by the serving edge node or the candidate edge node.

A seventh approach is associated with obtaining information of the candidate edge nodes, based on which, trimming the list of candidates. The information may include capability of the target nodes, current workload of the target nodes, predicted workload of the target nodes, or access privilege to the target nodes.

An eighth approach is associated with monitoring the requirements of the application client, the status of the edge application server and candidate edge nodes to detect the relocation trigger. The updated information from the monitoring may also be used to fine-tune the prediction of relocation timing and candidate list. The monitoring may be performed by interacting with the underlying communication network to obtain performance measurement, such as service latency to the candidate edge node. The monitoring operations associated with multiple applications on the same or multiple UEs may be aggregated.

A ninth approach is associated with sending a proactive relocation request to each of the candidate edge nodes. The request may include information of the UE and the EAS to be relocated. The request may include instructions of what operations are to be performed for pre-relocation, the timing to perform the operations, or trigger to perform the operations. The pre-relocation operation may include establishing connection from the UE to the candidate target, reserving resources at the candidate node, or instantiating the edge application server at the candidate node. The pre-relocation operation associated with multiple applications on the same or multiple UEs may be aggregated or coordinated.

A tenth approach is associated with performing application relocation when triggered. The exact relocation target may be determined before or after the relocation is triggered.

An eleventh approach is associated with notifying candidate nodes that are not selected as the relocation target. The unselected candidate nodes may be instructed to release the reserved resources, revert the pre-relocation operations, or maintain the pre-relocation status.

Architecture and Information Elements

Figure 4:
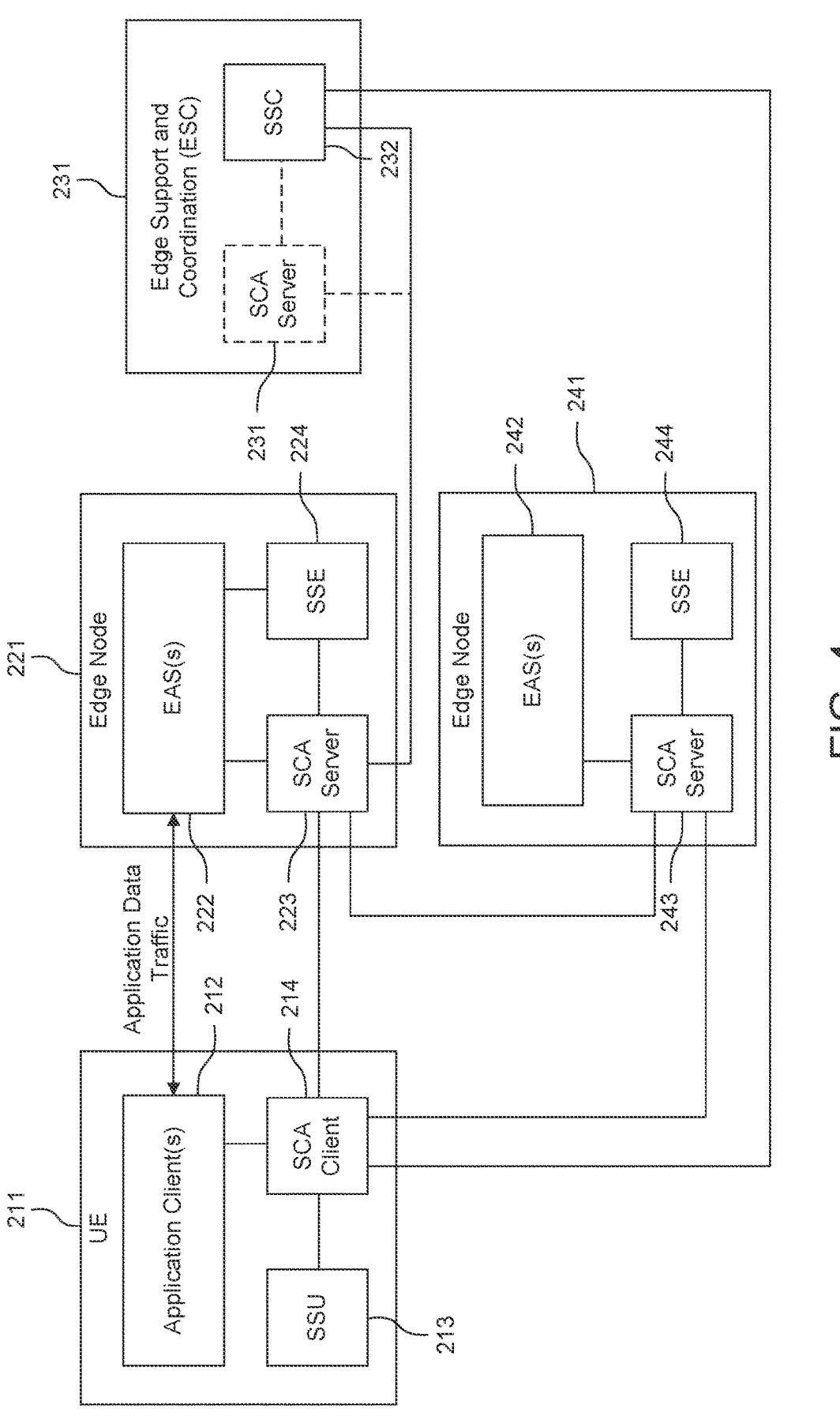
FIG. 4 illustrates an exemplary SCA Assisted Edge Application Relocation Architecture.

The entities involved in the relocation and the interactions among the entities are shown in FIG. 4. An edge application client 212 hosted on a UE 211 that is communicating with an edge application server (EAS) (e.g., EAS 222) hosted on an edge node 221 may be configured to switch from the currently serving edge node 221 to another edge node 241 due to the UE's mobility or dynamic resource allocations on the edge nodes. To ensure the service continuity, the corresponding edge application server 222 hosted on the edge node 221 may need to be relocated from the currently serving edge node 221 to a target edge node 241. Particularly, the edge application relocation could be performed as the following, such as an edge application server instance or an edge application server instance. For example, an edge application server instance hosted on the currently server edge node 221 and any edge application context it maintains are relocated to the target edge node 241. As a result, any edge application clients 212 associated with the edge application server 222 are directed to communicate with the relocated edge application server instance 242 located on the target edge node 241. In another example, an edge application server instance 222 hosted on one edge node 241 is not relocated, but the edge application context it maintains is relocated to another edge application server instance 241 of the same type which is already instantiated or is started up on the target edge node 241. Correspondingly, any edge application clients associated with the edge application relocation are directed to communicate with the edge application server instance 242 located on the target edge node 241.

To enhance the existing edge application server (EAS) relocation and support service continuity for edge computing systems, Service Continuity Assistance (SCA) function (e.g., SCA server 223) is disclosed to provide supporting functions for the relocation. The SCA function is responsible for obtaining information from the relevant entities that are involved in the relocation (e.g., Application Client 212, EAS 222, or EAS 242), and communicating with other supportive services that are deployed in the system (e.g., location management service). Exemplary entities involved in the relocation and the interactions among the entities are shown in FIG. 4.

Entities in the architecture may include UE 211, Edge 221, ESC 231, SCA server 223, SCA client 214, SSU 213, SSE 224, or SSC 232, as further described herein.

UE 211 may host one or more application clients, which may communicate with the application servers (e.g., EAS 222 or EAS 242) on the edge nodes (e.g., EAS 222 or EAS 242) or the cloud. UE 211 may also run an application locally, while offloading or relocating the application to an edge node or the cloud when needed. Disclosed herein are cases in which the application server may be instantiated at the edge nodes, however, the disclosed subject matter may also be applied to other scenarios where application relocation is needed.

An edge node (e.g., edge node 221 or edge node 241) may be the physical host of the edge application server(s) (e.g., EAS 222 or EAS 242), providing resources and services to the edge application servers. The amount of available resources or the capability provided by edge node 221 may change dynamically, depending on the workload at edge node 221 (e.g. number of edge application server instances running on edge node 221 or performance requirements of the application clients). The dynamic status of edge node 221 may be shared with other edge nodes (e.g., edge node 242), or reported to the core network.

Edge Support and Coordination (ESC) 231 is a collection of supportive and coordination services that are hosted in the core network, on edge support platforms external to the core network or both.

Service Continuity Assistance (SCA) service provides supporting functions for edge application server relocation. The SCA service is responsible for obtaining information from the relevant entities that are involved in the relocation (e.g., Application Client 212, EAS 222, or EAS 242), and communicating with other supportive services that are deployed at UE 211 or edge node 221 (e.g., location management service).

SCA Client 214 may be hosted at UE 211 and provides SCA service to support the edge application relocation. SCA Client 214 may communicate with application client(s) 212 and supportive services hosted on UE 211, and SCA servers on different edge nodes.

SCA server 223 may be hosted at edge node 221 or in the core network to provide SCA service. Herein, there is significant disclosure with regard to the entities on the edge nodes and UE and it may be assumed SCA server 223 may be hosted on the edge node only. SCA server 223 may communicate with the EAS(s) and supportive services hosted on the same edge node, the corresponding SCA Client 214, and other supportive services in the core network. SCA servers hosted on different edge nodes may also communicate with each other.

Supportive Service—UE (SSU) 213 is the service(s) hosted on UE 211 with which the SCA client 214 may interact to obtain information of UE 211 and application clients 212 that is related to the relocation.

Supportive Service—Edge (SSE) 224 is the service(s) hosted on edge node 221 with which the SCA server 223 may interact to obtain information of edge node 221 and the hosted EASs 222 that is related to the relocation.

Supportive Services—Core (SSC) 232 is a logical entity which includes service(s) with which SCA server 223 and SCA client 214 may interact with to obtain edge nodes (e.g., edge node 221 or edge node 241) and UE information that is related to the relocation. SSC 232 may be composed of services hosted in the core network, on edge support platforms external to the core network or both. Services in SSC 232 may be logically grouped, they do not need to be collocated.

Definitions and Information Elements

Relocation event type: The relocation event type may be defined as the reason or type of event that triggers the application relocation. Identifying the type of relocation may help selecting the target edge node for the relocation. Examples of relocation event type may include: UE mobility, edge node availability, load balancing, change of requirements, or multi-UE coordination, among other things.

UE mobility: The change of geographical location of UE 211, or the UE moving out of the service/coverage area of edge node 221 may impact the communication quality between UE 211 and edge node 221, which may trigger an application relocation.

Edge node availability: Due to the changing workload on the edge nodes 221 or maintenance schedule of the edge nodes 221, an edge node 221 may fail to provide required service or becomes unavailable/inaccessible to UE 211, which may trigger an application relocation.

Load balancing: The workload on edge nodes 221 may be adjusted for balancing the load and better serving the UEs 211, which may lead to the relocation of certain edge application servers 222.

Change of requirements: The service or capability requirements of the application client may not be fixed. Correspondingly, due to the change in requirements or service preference, an edge node 221 other than the currently serving one may be preferred and a relocation may be triggered.

Multi-UE coordination: In the scenario when an application client on one UE 211 needs to communicate with an application client 212 on another UE, while both have their application servers instantiated at the edge (e.g., an edge based multi-player gaming application), one or both of the edge applications may need to be relocated to the edge node 221 that may optimize the performance of both clients.

Neighbor Edge Node

SCA server 223 may maintain a neighbor list for the hosting edge node, which may include the neighbor edge nodes with which a service/application relocation may be performed. Each edge node (e.g., edge node 221 or edge node 241) in the neighbor list may be characterized with a neighbor profile, as shown in Table 1 or Table 2. The neighbor list and the neighbor profile may be created and updated by SCA server (e.g., SCA server 223 or SCA server 243). Other relevant entities in the system, such as an Application Client 212 or EAS 222, may send a request to SCA server 223 to create or update the neighbor list or neighbor profile.

TABLE 1

| Neighbor List | |
| --- | --- |
| Information Element | Description |
| Serving Edge Node ID | Identifier of the serving edge node, e.g., the owner of this neighbor list. |
| Neighbor Profiles | A list of neighbor profiles for the neighbor edge nodes, as detailed in Table 2. |

Each edge node 221 in the neighbor list may be involved in one or more type of relocation. For example, the geographical neighbors of edge node 221 (within a certain distance) may be included into the neighbor list for mobility-based relocation. Edge nodes 221 that have same/similar service area and resource configuration may be included into the neighbor list for load balancing based relocation.

TABLE 2

| Neighbor Profile | |
| --- | --- |
| Information Element | Description |
| Neighbor Node ID | Identifier of the neighbor edge node. |
| Relocation Event Type | Describes the type(s) of relocation that the neighbor node may be involved in. There could be more than one type of relocation that a neighbor could be involved in. |
| Accessibility Information | Describes accessibility information of the neighbor node, such as the geographical location of the neighbor node, access privilege to the neighbor node, maintenance schedule of the neighbor node. The information will be used to determine whether the neighbor could be a candidate target for a service relocation. For an edge node, its neighbor may belong to the same service provider or a different service provider. In the case that a neighbor node belongs to a different service provider, if inter-provider service relocation is not allowed, the node will not be included in the neighbor list. Otherwise, the node may be included in the neighbor list while any specific limitation regarding inter-provider service relocation may be included in the Accessibility Information. |
| Capability Information | Describes capability information of the neighbor node, such as the total storage size, maximum computation power, maximum communication bandwidth, etc. Information of the entities hosted or may be hosted on the node and their capabilities may also be included, such as the types of EASs that the node is capable or allowed to host, types of UEs that the node is able to connect with (e.g., specific operators/SIMs), and information of the SSE(s). The information may be used to determine whether the neighbor may be a candidate target for a particular relocation. Note that the capability information contained in this element is mainly used to capture the static configuration of an edge node, and may not reflect the node's dynamic capability. Correspondingly, this element does not require frequent update. The dynamic information of an edge node's capabilities will be included in the Candidate Profile (Table 5) when the neighbor node is selected as a candidate. |

TABLE 2-continued

| Neighbor Profile | |
| --- | --- |
| Information Element | Description |
| Relocation Status | Describes whether the neighbor node is involved in any ongoing or potential relocation, as well as the corresponding Relocation ID(s), if applicable. Each entry is defined as a tuple of [Status, Relocation ID]. The information will be updated whenever this neighbor node is added to or removed from a candidate list. Example status may include: Non-candidate: the neighbor edge node is not a candidate for any potential relocation. Candidate: the neighbor node is the candidate for at least one potential relocation, and is included in the corresponding candidate list(s). Pre-relocated: pre-relocation has been performed on this neighbor node. Relocating: the neighbor node has been selected as the relocation target and the relocation is being performed to this node. |

Relocation Trigger Criteria:

The trigger criteria are the events or conditions that may trigger the relocation. The trigger criteria of a relocation are the direct conditions that lead to the decision of the relocation. While the actual event or reason that triggers the relocation may vary (different relocation event types), the underlying condition for a relocation depends on the performance/quality of the received service at the application client 212 at UE 211. Moreover, it is also to be considered how the relocation may impact the service performance due to service interruption or possible delay introduced by the relocation. As a result, the trigger criteria for the relocation may be defined based on monitoring and estimating the service quality at the application client 212, and the timing of a relocation may be defined as the turning point when better service performance may be achieved with the target edge node (e.g., edge node 241) as compared to the current serving edge node (e.g., edge node 221).

For example, for a mobility-based relocation, the event that UE 211 is moving out of the service area of the current serving edge node 221 and into the service area of another edge node 241 may trigger relocation. However, a more accurate indicator may be based on the service latency associated with the serving edge node 221 and the target edge node 241. This way, the relocation may not need to wait until UE 211 has left the current service area, and the decision may be made by jointly considering not only the geographical location aspect but also other aspects such as the communication quality. As seen from this example, the trigger criteria may be defined based on a measurement of the performance of service received at the application client at UE 211, which may more accurately and timely reflect the need and timing for relocation. Trigger criteria defined in this way may include the examples in Table 3.

TABLE 3

| Relocation Trigger Criteria | | |
| --- | --- | --- |
| Measurement | Event Description | Relevant Entities |
| Communication time | For a time sensitive application, the trigger event may be defined as "the communication latency between the UE and a candidate edge node is less than that between the UE and the serving edge node, and the communication latency between the UE and the serving edge node is higher than a threshold". The first condition in the trigger event may help to identify edge nodes that may provide better service quality (e.g., indicated by being with certain numerical thresholds) than the current one, while the second condition helps prevent frequent switching and relocation to minimize service interruption. | The communication time may be measured by the SCA Client or SSU after the UE establishes a connection with the candidate edge node (refer to pre-relocation). The trigger may be detected by the SCA Client, or by the SCA Server if the measurement information is shared by the SCA Client to the SCA Server. |
| Computation Power/ Processing time | For a computation intensive application, the computation power or processing time at the edge node becomes a critical factor. In this case, the trigger event may be defined based on comparing the computation power or the processing time for a specific task at a candidate edge node and at the serving edge node. | The computation power or processing time at an edge node may be measured by the SCA Server or SSE hosted at the edge node(s). The trigger may be detected by the SCA Server, or by the SCA Client if the measurement information is shared by the SCA Server(s) to the SCA Client. |

TABLE 3-continued

| | Relocation Trigger Criteria | |
|---|---|---|
| Measurement | Event Description | Relevant Entities |
| Total response time | The total response time is the sum of the communication latency with an edge node and the processing time at the edge node (the combination of the above two). The trigger event may be defined in a similar way as that of the communication time or processing time. | The total response time may be measured by the entities that are involved for measuring the communication time and processing time. The trigger may be detected by the SCA Server or the SCA Client assuming the relevant information is shared between the entities. |
| Storage capacity | For a storage demanding application, the storage capacity at an edge node that is available for serving an EAS may be used for defining the trigger event. For example, the trigger event may be defined as "the available storage capacity at a candidate edge node is higher than that of the serving edge node, and the capacity of the serving edge node is lower than a threshold". | The available storage capacity at an edge node may be measured by the SCA Server or SSE hosted at the edge node. The trigger may be detected by the SCA Server, or by the SCA Client if the measurement information is shared by the SCA Server to the SCA Client. |

In order to detect the trigger event, SCA server 223 or SCA client 214 may monitor the status of the serving edge node 221 and candidate edge node(s) 241, the status or requirements of the application client 212, the status of the EAS 222, and communicate with other relevant services/entities (SSU 213, SSE 224, SSC 232) for information related to the trigger. SCA server 223 and SCA client 214 may also obtain assistance from an underlying communication network function to obtain measurements of service performance and generate a reliable trigger for relocation. For example, SCA client 224 may subscribe to receive notifications if/when another edge node 241 becomes available, obtain measurement of service performance (e.g., communication latency) between the UE 211 and the edge node 221, and perform further measurement on the capability of the edge node 221.

Based on the information, the SCA server 223 or SCA client 214 may further predict the exact relocation target edge node 241 or the timing of relocation. For example, the SCA server 223 may monitor the status of the current serving edge node 221 and its neighbors, identify the trends of the changing of available edge resources and capabilities. Based on the observation, the SCA server 223 may predict the future service quality received at the UE 211, determine whether a relocation will be needed, and estimate the timing for the relocation.

In another scenario, SCA client 214 may acquire the service requirements from the application client 212, determine whether a re-selection of edge node 221 should be performed based on the changing requirements and choose the optimal edge node to meet the requirements of the application. For example, an edge-based gaming application (e.g., application client 212) may have dynamic requirements on the communication latency and processing capability (e.g., graphic rendering) depending on the real-time in-game content and population. When the population is high, the application client 212 may relax the requirement on processing power but tighten the requirement on communication latency. When aesthetic content is to be presented to the player/UE, the requirements on the processing capability may be prioritized over that of the communication latency. Depending on the dynamically changing requirements, the most suitable edge node may be selected and a relocation may be performed accordingly.

In addition to the above-mentioned use cases, the relocation may also be triggered when the SCA (e.g., SCA client 214, SCA server 223, or SCA 256) receives a notification indicating the need for relocation from a relevant entity such as SSC 232, SSE 224, or SSU 213. For example, the core network may perform measurement on the edge networks and send a notification to the SCA to trigger the relocation.

Pre-relocation: Some operations performed in the relocation may be performed before the actual relocation is triggered in order to reduce the impact of service interruption and minimize the delay that is introduced by the relocation. These operations may be performed proactively as the pre-relocation. The pre-relocation may also be performed to establish connections between UE 211 and a candidate edge node 241 so that the SCA may evaluate the performance of service provided by a candidate edge node 241 to UE 211. The pre-relocation may be performed with the target edge node 241 or with the candidate edge node(s) 241 if the exact relocation target cannot be determined at the time of pre-relocation.

During the pre-relocation, the target/candidate edge node 241 may be informed by the SCA that a potential relocation may be performed to it, and the relocation profile may be shared with the SCA server(s) 243 at the candidate edge node(s) 241. In addition, information that may assist the relocation may be transmitted to the target/candidate edge node(s) 241. If the service/application to be relocated is stateless, the application context may be transferred to the target/candidate edge node(s) 241 during pre-relocation. For a stateful application, any information or application context that is not real-time generated (e.g., configuration information) may be transferred to the target during pre-relocation.

During the pre-relocation, the target/candidate edge node(s) 241 may reserve the resources/capabilities that will be used by the relocated EAS. In the case that the target edge node 241 has not instantiated the desired EAS, the instantiation may be performed during pre-relocation.

The timing or trigger of the pre-relocation may be determined in a similar way as the relocation. For example, the pre-relocation may be scheduled right before the relocation, or at a pre-defined length of time ahead of the relocation to accommodate the time consumption of pre-relocation. The pre-relocation may also be triggered when a notification is received by the SCA from the SSU 213, SSE 224, or SSC 232.

After a candidate edge node 241 is pre-relocated, the candidate edge node 241 may share its information with the serving edge node 221 or the UE 211 through the SCA Server 223 and Client 214. Further, the SCA Server 223 at the candidate edge node may send a "pull notification" to the SCA Server/Client at the service edge node or the UE to trigger the relocation.

In the case where a candidate edge node 241 has been pre-relocated but the actual relocation is not performed on this node, the reserved resources may be released and the relocation related information may be removed. For example, an edge node 241 may be selected as the candidate and pre-relocated when a UE 211 is approaching. After the actual relocation is performed to another edge node and the UE 211 moves away from this edge node, the edge node is no longer a candidate and the pre-relocation may be reversed.

Alternatively, the edge node 241 may maintain the pre-relocated status if it is still a candidate. For example, multiple edge nodes in the same area are cooperating on balancing the workload, and each of them may be the candidate for the relocation of the EAS(s) running on other edge nodes. When an edge node is not selected for one relocation instance, the edge node may still be the candidate for a future relocation, therefore, the pre-relocation status may be kept. In another example, maintaining the pre-relocation status may be used to support redundancy. Some applications may have a service level agreement guaranteeing a certain level of service reliability. To ensure the reliability requirement is met, one or more edge nodes may be pre-relocated as secondary backups in case a serving edge node becomes unavailable for any reason. If this happens another edge node is ready and available to provide service.

Relocation Profile: When an EAS 222 is instantiated or a new application client 212 is connected to the EAS 222, the SCA determines the potential of a relocation, based on factors such as mobility of UE(s) 211 using the EAS 222, requirements of one or more application client's requirements for supporting service continuity, the requirement or demand of the corresponding EAS 222 (e.g. an EAS requires a limited/constrained resource at the edge), status of the corresponding edge node 221 (e.g. scheduled maintenance). Alternatively, the SCA may receive a request for service continuity support from relevant entities such as the application client or the EAS.

If a potential relocation exists, the SCA will create a Relocation Profile for the relocation instance, and select candidate edge nodes 241 which are the possible target/destination nodes for the relocation. The candidate edge nodes 241 may be selected from the neighbor list based on the relocation event type and the application client or EAS information. In an example, if the relocation is UE mobility based and the UE's route is known, the candidate edge nodes 241 may be selected as the neighbor edge node that is the closest to the predicted location of UE 211. In an example, if the relocation is UE mobility based and the UE's route is unknown, the candidate edge nodes 241 may be selected as the neighboring edge nodes of the current serving edge node. In an example, if the relocation is load balancing based, the candidate edge nodes 241 may be selected as the neighbor edge node(s) that are co-located with the current serving edge node 221.

More than one type of potential relocation may exist for the same EAS 222 simultaneously (though different relocation instances may be triggered at different time), each potential relocation is assigned with a different relocation ID and managed separately (as different types of relocation may be associated with different trigger criteria and candidate selection). Each relocation instance may be managed with a Relocation Profile, which may be created by the SCA server 223 at the serving edge node 221 or the SCA client 214 at the UE 211, and managed by both entities, as detailed in Table 4. The Relocation Profile may be hosted by the SCA Server 223 or the SCA Client 214, and updated by relevant SCA entities.

TABLE 4

| Relocation Profile | |
| --- | --- |
| Information Element | Description |
| Relocation Instance ID | A unique identifier for the relocation instance. |
| Relocation Event Type | The event type of relocation. Each relocation instance is associated with only one relocation event type. |
| UE information | Information of the UE associated with this relocation. |
| Serving Node Information | Information of the source edge node that is currently serving the UE. |
| Application Information | Information of the EAS to be relocated and the application client, such as the requirements of the application client, and information that may assist in determining the relocation trigger criteria or timing for relocation. The information may be obtained from the application client or the edge application server. This information element may be updated according to the dynamically changing requirement or status of the relevant entities. |
| Candidate List | List of Candidate Profiles (Table 5). The candidate list may be dynamically updated to remove the edge nodes that are no longer qualified for the relocation. |
| Trigger Criteria | Defines the trigger criteria for this relocation (Table 3). |
| Relocation Status | Defines the status of the relocation instance. Possible status of a relocation may include: Initialization: the default status after a relocation profile is created. Monitoring: the SCA server or client is monitoring related entities and information for the trigger event. If not specified, the SCA may start the monitoring right after the initialization phase. |

TABLE 4-continued

| Relocation Profile | |
| --- | --- |
| Information Element | Description |
| | Pre-relocation: pre-relocation has been performed on the candidate edge nodes. Triggered: the relocation is triggered and the application context is being transferred to the target edge node. Completed: the relocation has been completed. |
| Prediction Information | Predicted timing of the relocation, i.e. when the relocation will be triggered. Node-specific predicted timing (if any) is defined in the corresponding Candidate Profile. If both are defined, whichever comes earlier will be taken as the prediction result. |
| Monitoring Operation | Defines when and how to perform the monitoring for evaluating the trigger criteria and updating relocation related information, such as when to start the monitoring, what entities are to be monitored, the schedule or frequency of updates, what information is to be collected from each monitored entity. For example, the monitoring may be started when the processing time of the serving edge node or the communication latency with the serving edge node is higher than a threshold (different from the threshold defined in the trigger criteria). Node-specific monitoring operation (if any) is defined in the corresponding Candidate Profile. |
| Pre-Relocation Operation | Defines if/when to perform pre-relocation and what operation(s) will be performed in the pre-relocation, such as establishing connection from the UE(s) to the candidate edge node(s), reserving resources at the candidate node(s), instantiating the edge application server at the candidate node(s), etc. The operations defined in this information element may not be performed all at once, in which case this information element may specify the timing or trigger for each of the operation. This information element also specifies whether the candidate edge node(s) should release/maintain reserved resources after the relocation is completed elsewhere. Node-specific pre-relocation operation (if any) is defined in the corresponding Candidate Profile. |

For each candidate edge node 241 in the candidate list, the SCA will monitor and evaluate the possibility of relocation for each of them. A candidate profile may be created and maintained for each candidate edge node 241 to record the information of the node, as shown in Table 5. The candidate profile is created by the same entity that creates the relocation profile, and may be updated by the relevant SCA entities such as the SCA Client 214 at the UE 211 or the SCA Server 223 at the serving edge node 221.

TABLE 5

| Candidate Profile | |
| --- | --- |
| Information Element | Description |
| Candidate Node ID | Identifier of the candidate edge node. |
| Static Information | Static information of the candidate edge node that is related to the relocation. The information will be configured when the candidate edge node is added to the candidate list. |
| Dynamic Information | Dynamic information of the candidate edge node that is related to the relocation. The information will be configured when the edge node is added to the candidate list and updated during the monitoring phase of the relocation. The dynamic information may further include the information that may be used for evaluating the trigger criteria, such as the received service quality at the UE from the candidate node. |
| Prediction Information | Predicted information regarding the potential relocation to this candidate edge node, such as the timing of this candidate being involved in the relocation. The prediction is based on the collected static and dynamic information of the candidate node. If not specified, the prediction information will be the same as defined in the corresponding relocation profile. |
| Monitoring Operation | Defines the node-specific monitoring operation for the candidate edge node. If not specified, the monitoring operation will be the same as defined in the corresponding relocation profile. |
| Pre-Relocation Operation | Defines the node-specific pre-relocation operation for the candidate edge node. If not specified, the pre-relocation operation will be the same as defined in the corresponding relocation profile. |

General Procedure for SCA Assisted Enhanced Relocation

Figure 5:
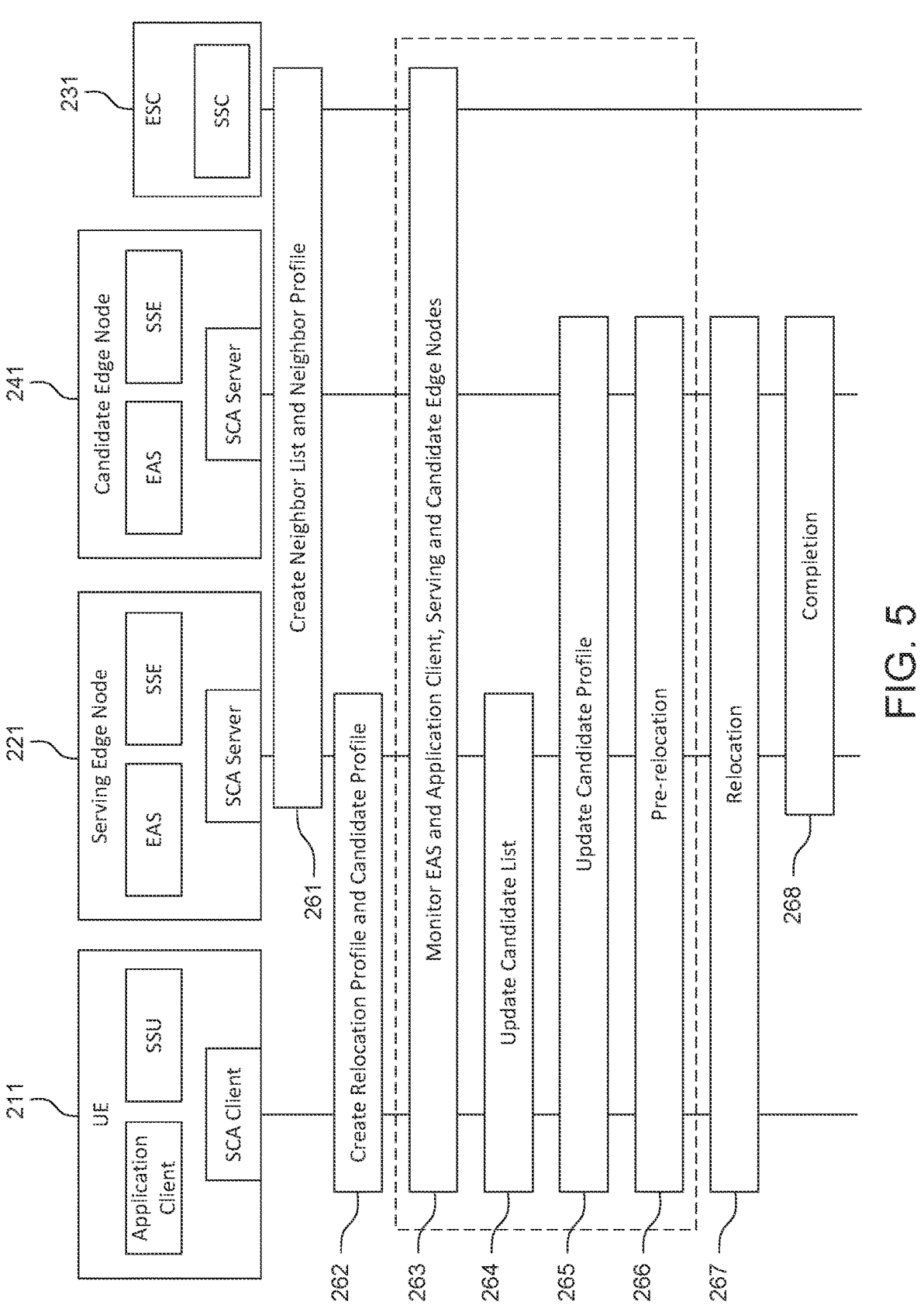
FIG. 5 illustrates an exemplary procedure for Enhanced Relocation.

FIG. 5 illustrates an exemplary enhanced relocation procedure assisted by the disclosed SCA function. Particularly, the SCA function enables the prediction of the target and timing for the relocation by dynamically monitoring the relevant entities, defines an accurate and reliable trigger for relocation, facilitates proactive relocation by performing pre-relocation operations to minimize service interruption.

At step 261 of FIG. 5, SCA server 223 may construct a neighbor list for each edge node where a relocation may be potentially performed. The neighbor list may include neighbor profiles of the edge nodes. When creating the neighbor profiles, the accessibility and capability information of the neighbor edge nodes may be obtained by querying the corresponding SCA server or SSE at each of the individual edge nodes, or through a centralized edge management/configuration entity (such as the SSC 232 at the core network) which is maintaining the information of the edge nodes.

At step 262 of FIG. 5, when a potential relocation is detected or a request for service continuity support is received from the application client 212 or the EAS 222 at the serving edge node, the SCA server 223 at the serving edge node 221 may create a relocation profile to manage the relocation. The SCA server 223 may identify the event type of the potential relocation, and obtain the service or performance requirements of the corresponding application client from the application client 212 or the EAS 222. Based on this, the SCA server 223 may filter the neighbor list to select a list of candidate edge nodes and create the candidate profile for each of them. The candidate profiles may be initialized with the information obtained from the corresponding neighbor profile of the edge node. The SCA server 223 may also define the trigger criteria for this relocation based on the above information. In addition, the SCA server 223 may define if pre-relocation may be performed. If so, the SCA server 223 may determine the operations to be taken for the pre-relocation, and the timing or trigger for each operation. The created relocation profile may be shared with the SCA Client 214 so that the latter may be able to update the profile. Alternatively, the relocation profile may be created by the SCA Client 214 and shared with the SCA server 223. The following step 263 of FIG. 5 to step 266 of FIG. 5 may be performed iteratively or repeatedly in any order depending on the corresponding settings defined in the relocation profile.

At step 263 of FIG. 5, after the list of candidate relocation targets are selected, the SCA Server 223 and client 214 may start to monitor the candidates for trimming the candidate list or detecting a trigger event. Depending on the defined trigger criteria, this step may include retrieving the dynamic information of the candidate edge node 241, monitoring the service quality of application client 212 and EAS 222, evaluating each of the candidate edge nodes, and other operations as defined in the Monitoring Operation. The SCA performs this step to obtain dynamic and real-time information of the edge nodes, such as the resource utilization status of both the serving edge node 221 and the candidate edge nodes 241. If a pre-relocation operation has been performed and UE 211 has established connection with the candidate edge nodes 241, the SCA may further measure the communication quality (e.g., service latency) with the candidate edge nodes 241 by interacting with the underlying communication network. In addition, the SCA may request assistance from the SSU 213, SSE 224, or SSC 232 in obtaining the above information. For example, the SCA may retrieve information or receives notifications from the core network through the SSC 232.

At step 264 of FIG. 5, based on the information collected from step 263 of FIG. 5, the SCA server 223 or SCA client 214 may update the candidate list by removing edge nodes that are found to be not qualified. Since a neighbor node is added to the candidate list merely based on partial information of the node and the capability and status of the edge node may be changing over time, it is possible that the SCA may find a candidate edge node 241 that is not qualified for the relocation after obtaining updated information of the node in step 263 of FIG. 5. In this case, the edge node may be removed from the candidate list.

At step 265 of FIG. 5, based on the trigger related information obtained from monitoring candidate edge nodes 241 and status of the Application Client 212 and EAS 222, the SCA server 223 and SCA client 224 may update the candidate profile, predict the timing of the relocation and determine when to perform the operation(s) for pre-relocation.

At step 266 of FIG. 5, pre-relocation may be performed between the serving edge node 221 and the candidate edge node 241. If not specified, the pre-relocation operations defined in the relocation profile may be performed to candidate edge nodes 241. If a candidate target edge node 241 has a specific pre-relocation operation, the operation may be performed on the individual edge node. With the pre-relocation, SCA server 243 at the candidate edge node 241 may be notified of the potential relocation and start to actively send its information to the SCA server 223 at serving edge node 221 or SCA client 214 at the UE 211 (as compared to step 263 where the information is passively retrieved by serving edge node 221 or UE 211). The relocation profile may be shared with SCA server 243 at candidate edge node 241 so that the latter may be able to detect the trigger event and notify serving edge node 221 or UE 211. A pre-relocation operation may also include establishing a connection between UE 211 and the candidate edge nodes 241. After the connection is established, the SCA client 214 may be able to interact with the underlying communication network and accurately measure the service quality (e.g., communication latency) received by the application client 212 from a candidate edge node 241. The measurement may then be used for evaluating trigger criteria and generating a reliable trigger for the relocation.

At step 267 of FIG. 5, the relocation is triggered and performed between the source edge node 221 and target edge node 241.

At step 268 of FIG. 5, after the relocation is completed, the relocation profile may be propagated to target edge node 241 and updated with the new relocation profile by updating the serving edge node information and the candidate list. The candidate edge nodes that are not selected as the actual relocation target will be notified (e.g., notified by the SCA) that the relocation has been performed elsewhere. The notified edge nodes may release the resources reserved during pre-relocation. Alternatively, the notified edge nodes may maintain the pre-relocation status in case the node is selected as candidate in the new relocation profile.

Figure 6:
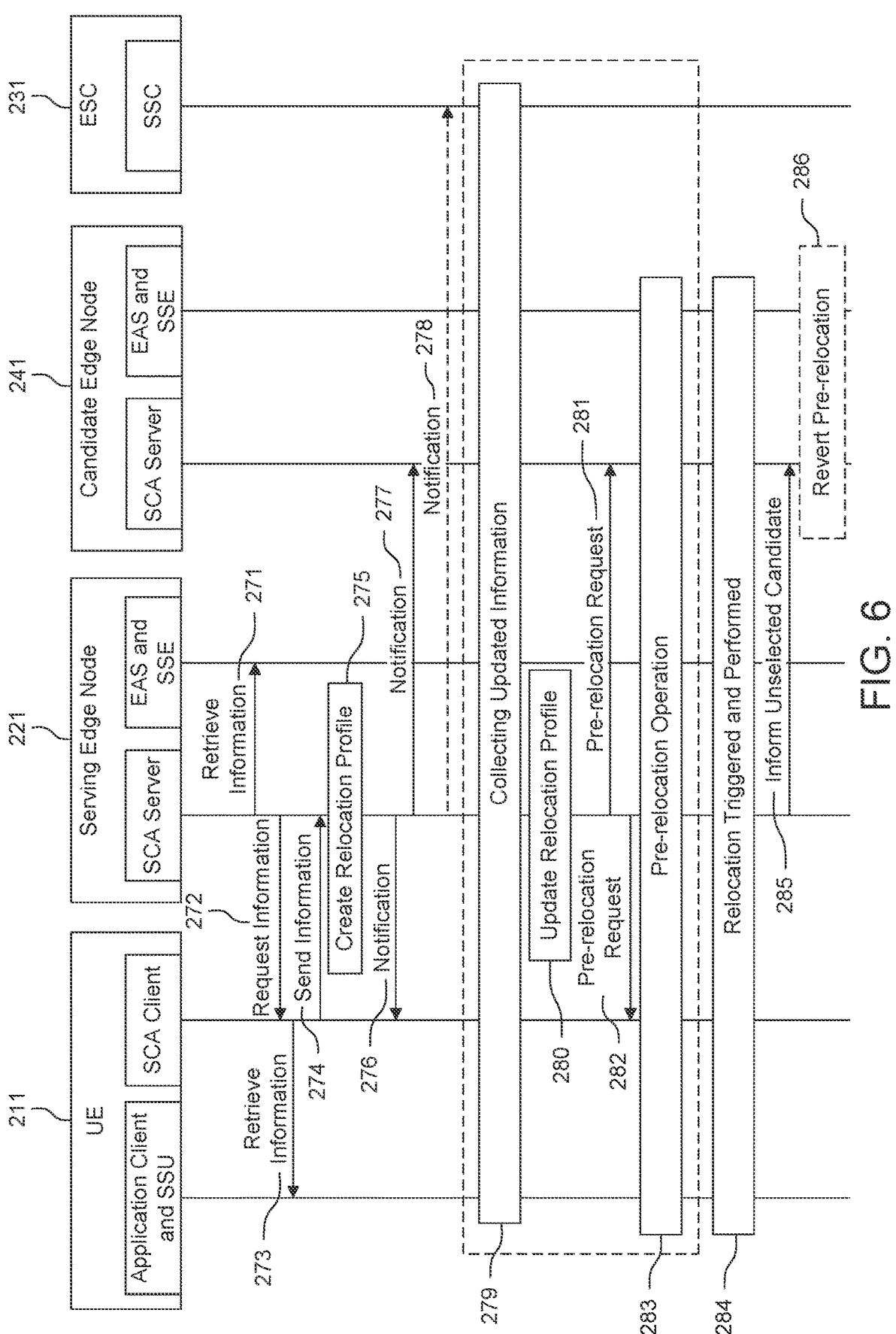
FIG. 6 illustrates a first exemplary proactive relocation (Relocation Profile maintained at SCA Server)
Figure 7:
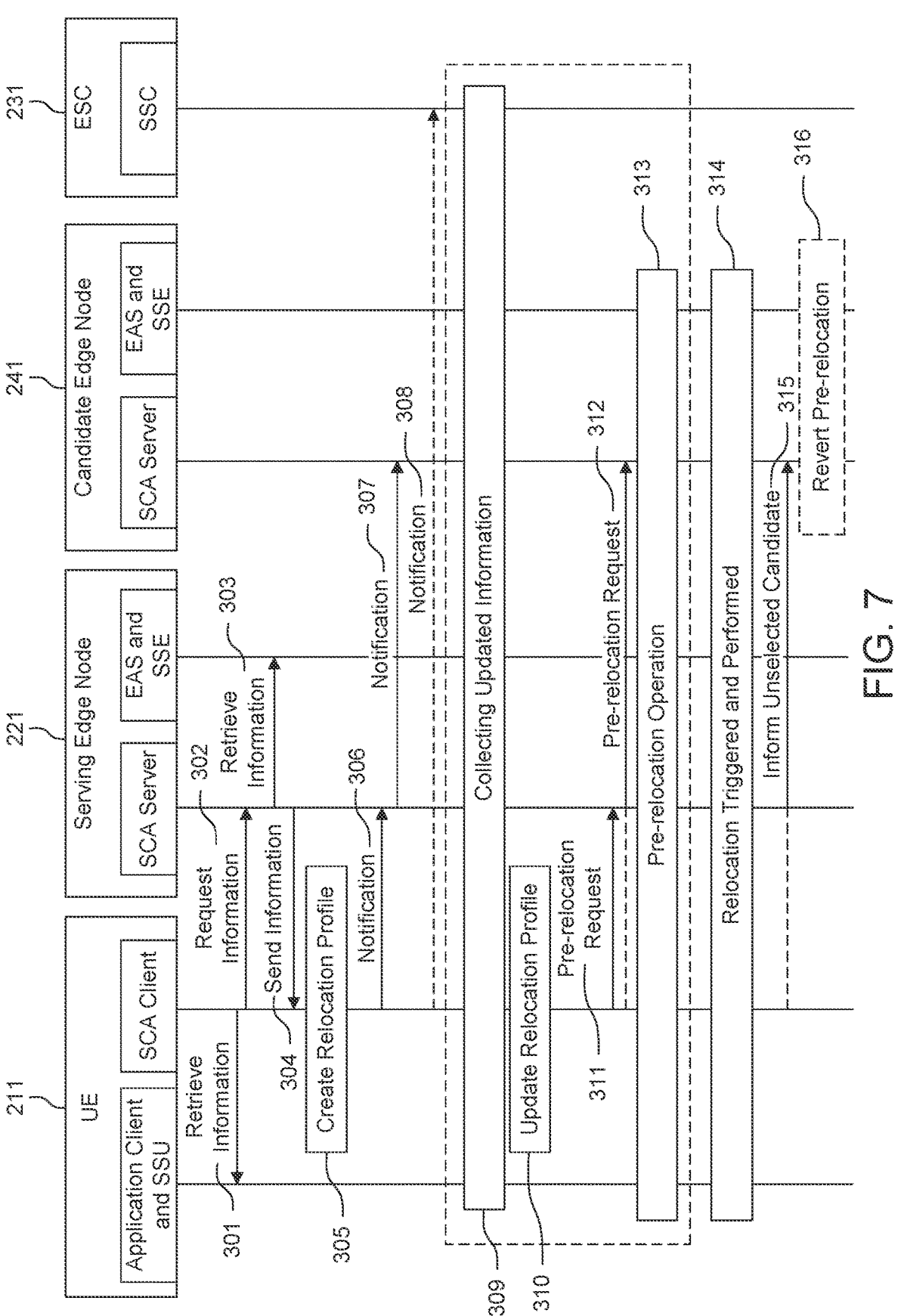
FIG. 7 illustrates a second exemplary proactive relocation (Relocation Profile maintained at SCA Client)

Proactive Relocation: With the disclosed SCA function, the relocation may be performed proactively by predicting the relocation target and timing and performing pre-relocation operations before the actual relocation is triggered. FIG. 6 and FIG. 7 illustrate examples of proactive relocation enabled by the disclosed SCA function. FIG. 6 illustrates an example in which the relocation profile is maintained at the SCA server. FIG. 7 illustrates an example in which the relocation profile is maintained at the SCA client.

Pre-conditions: SCA server 223 may create a neighbor list for the serving edge node 221. A potential application relocation is detected by SCA server 223 or SCA server 223 receives a request from the EAS 222 or SCA client 214 to manage a potential relocation.

At step 271 of FIG. 6, SCA server 223 retrieves information relevant to the potential relocation from EAS 222 and SSE 224, such as the requirement or status of the EAS 222.

At step 272 of FIG. 6, SCA server 223 may send a request to the SCA client 214 to retrieve information of the application client 212 and the UE 211.

At step 273 of FIG. 6, SCA client 214 may retrieve information relevant to the potential relocation from the application client 212 and SSU 213.

At step 274 of FIG. 6, SCA client 214 may forward the information obtained from the previous step 273 to the SCA server 223. Other information relevant to the relocation that is maintained by the SCA client 214 may also be sent to the SCA server 223.

At step 275 of FIG. 6, SCA server 223 may create the relocation profile based on the information obtained from the previous steps. The relocation event type may be determined based on the application information or information of serving edge node 221. Based on the type of the relocation, a list of candidate edge nodes may be selected from the neighbor list of the serving edge node 221, and a candidate profile may be created for each of the candidate edge nodes 241. In addition, SCA server 223 may define the trigger criteria, monitoring operation, or pre-relocation operation for the relocation.

At step 276 of FIG. 6, SCA server 223 may send a notification to SCA client 214, informing the creation of the relocation profile, and may instruct SCA client 214 to perform the monitoring operations as defined in the relocation profile.

At step 277 of FIG. 6, SCA server 223 on serving edge node 221 may send a notification to SCA server 223 on each of the candidate edge nodes 241 and instructs the latter to perform monitoring operations as defined in the relocation profile.

At step 278 of FIG. 6, the SCA server 223 may send a notification to the relevant SSC 232 if any service from the core network is needed to assist the relocation.

The following step 279 of FIG. 6 to step 283 of FIG. 6 may be performed iteratively or repeatedly in any order depending on the corresponding settings defined in the relocation profile.

At step 279 of FIG. 6, SCA server 223 may monitor or retrieve updated information from EAS 222 or SSE 224 hosted on the same serving edge node 221. SCA server 223 may receive or request updated information from the other entities that may be involved in the relocation (such as the entities notified in the previous steps), including SCA client 214 (and the corresponding application client 212, SSU 213), SCA servers on the candidate edge nodes 241 (and the corresponding EASs, SSE), or SSC 232. The collected information may be used to update the relocation profile, determining the timing and candidate edge nodes 241 of pre-relocation, and detecting the trigger for relocation. This step may be repeated according to the schedule defined in monitoring operation.

At step 280 of FIG. 6, based on the updated information collected from step 279, SCA server 223 may update the relocation profile and the corresponding candidate profiles, and may predict the timing of relocation. In an example case, the exact target edge node 241 for relocation may be determined by SCA server 223 before the relocation is triggered. In this case, the candidate list may be reduced to only one edge node. Once the target edge node 241 is determined, the SCA may predict the timing of the relocation to this target edge node 241 (and determine when to perform the operation(s) for pre-relocation).

With continued reference to step 280 of FIG. 6, in another case, the target edge node 241 for relocation may not be determined by the SCA server 223 before the relocation is triggered. In this case, SCA server 223 may trim the candidate list by removing edge nodes that are not suitable/preferable as a relocation target after obtaining updated information of the edge nodes. For example, if UE 211 is moving away from a candidate edge node 241 and the service quality provided from this node cannot outperform other candidates, the candidate edge node may be removed from the candidate list. Although the exact relocation target cannot be determined, SCA server 223 may still predict the timing of the relocation and pre-relocation based on the trigger related information obtained from monitoring the application status, serving edge node 221, and the candidate edge nodes 241.

At step 281 of FIG. 6, at the timing specified by the pre-relocation operations, SCA server 223 sends a pre-relocation request to each of candidate edge node 241 (or the target edge node 241, if has been determined). In the request, SCA server 223 may specify the operations to be taken by the candidate/target edge node 241 as defined in the pre-relocation operation. If there are multiple pre-relocation operations defined at different timing, this step will be performed multiple times accordingly.

At step 282 of FIG. 6, SCA server 223 also may send a pre-relocation request to SCA client 214 if the application client 212 is also involved in the pre-relocation operations.

At step 283 of FIG. 6, as instructed by SCA server 223, the relevant entities perform the pre-relocation operations accordingly.

At step 284 of FIG. 6, when the relocation is triggered, the SCA server 223 determines the target edge node for relocation and informs the SCA client 214 on the UE 211. The relocation is then performed between the serving edge node and the target edge node.

At step 285 of FIG. 6, the SCA server 223 sends a notification to the SCA servers of the unselected candidate nodes and instruct them to release the resources reserved for the relocation during pre-relocation or revert the pre-relocation operations as defined in the Pre-relocation Operation.

At step 286 of FIG. 6, after receiving the notification and instruction of step 285 of FIG. 6, the SCA servers of the unselected candidate nodes may release the resources reserved for the relocation or revert the pre-relocation operations.

FIG. 7 illustrates an exemplary proactive relocation (e.g., relocation profile maintained at SCA client 214).

Pre-conditions: The SCA server 223 has created a neighbor list for the serving edge node. A potential application relocation is detected by SCA client 214 or SCA client 214 receives a request from the application client 212 or SCA server 223 to manage a potential relocation.

Step 301 of FIG. 7, SCA client 214 may retrieve information relevant to the potential relocation from application client 212 and SSU 213, such as the requirement and status of application client 212.

At step 302 of FIG. 7, SCA client 214 may send a request to SCA server 223 to retrieve the neighbor list and information of the EAS 222 and serving edge node.

At step 303 of FIG. 7, SCA server 223 retrieves information relevant to the potential relocation from EAS 222 and SSE 224.

At step 304 of FIG. 7, SCA server 223 may forward the information obtained from the previous step to SCA client 214. Other information relevant to the relocation that is maintained by SCA server 223 (such as the neighbor list of the serving edge node 221) may also be sent to SCA client 214.

At step 305 of FIG. 7, SCA client 214 may create the relocation profile based on the information obtained from the previous steps. The relocation event type may be determined based on the application information or information of serving edge node 221. Based on the type of the relocation, a list of candidate edge nodes may be selected from the neighbor list of the serving edge node 221, and a candidate profile may be created for each of the candidate edge nodes 241. In addition, SCA client 214 may define the trigger criteria, monitoring operation, or pre-relocation operation for the relocation.

At step 306 of FIG. 7, SCA client 214 may send a notification to SCA server 223, informing the creation of the relocation profile. Since the SCA may not be able to interact with candidate edge nodes 241 at this point, SCA client 214 may instruct SCA server 223 to perform the monitoring operations on both serving edge node 221 or candidate edge nodes 241 as defined in the relocation profile.

At step 307 of FIG. 7, as requested by SCA client 214 in step 306, SCA server 223 on serving edge node 221 may send a notification to SCA server 223 on each of the candidate edge nodes 241 and may instruct the latter to perform monitoring operations as defined in the relocation profile.

At step 308 of FIG. 7, SCA client 214 may send a notification to the relevant SSC 232 if any service from the core network is needed to assist the relocation.

Step 309 of FIG. 7 to step 313 of FIG. 7 may be performed iteratively or repeatedly in any order depending on the corresponding settings defined in the relocation profile.

At step 309 of FIG. 7, SCA client 214 may monitor and may retrieve updated information from application client 212 and SSU 213 hosted on UE 211, and may receive or may request updated information from other entities that may be involved in the relocation (which have been notified in the previous steps), including SCA server 223 (and the corresponding EAS 222 or SSE 224), SCA servers 243 on candidate edge nodes 241 (and the corresponding EASs 242 or SSE 244), or SSC 232. The updated information of the candidate edge nodes 241 may be directly retrieved from the candidate nodes if the UE 211 has established a connection with the node, or forwarded by SCA server 223 on serving edge node 221. The collected information may be used to update the relocation profile, determining the timing and candidate edge nodes 241 of pre-relocation, or detecting the trigger for relocation. This step 309 may be repeated according to the schedule defined in monitoring operation.

At step 310 of FIG. 7, based on the updated information collected from step 309 of FIG. 7, SCA client 214 may update the relocation profile and the corresponding candidate profiles, and predict the timing of relocation. In an example case, the exact target edge node for relocation may be determined by SCA client 214 before the relocation is triggered. In this case, the candidate list may be reduced to only one edge node. Once the target edge node 241 is determined, the SCA may predict the timing of the relocation to this target edge node 241 (and determine when to perform the operation(s) for pre-relocation). For example, SCA client 214 may identify target edge node 241 based on the UE 211's route information obtained from SSU 213 for a mobility type of relocation. In another example case, target edge node 241 for relocation may not be determined by SCA client 214 before the relocation is triggered. In this case, the SCA client 214 may trim the candidate list by removing edge nodes that are not suitable/preferable as a relocation target after obtaining updated information of the edge nodes.

At step 311 of FIG. 7, at the timing specified by the pre-relocation operations, SCA client 214 sends a pre-relocation request to the SCA server 223 on serving edge node 221. If SCA client 214 has not established connection with the candidate edge nodes 242, SCA client 214 may request SCA server 223 to forward the pre-relocation request to candidate edge nodes 241.

At step 312 of FIG. 7, SCA client 214/SCA server 223 may send a pre-relocation request to each of the candidate edge node 241 (or the target edge node, if has been determined). In the request, the SCA client 214 or SCA server 223 may specify the operations to be taken by the candidate/target edge node 241 as defined in the pre-relocation operation. If there are multiple pre-relocation operations defined at different timing, this step 312 may be performed multiple times accordingly.

At step 313 of FIG. 7, as instructed by the SCA client 214/SCA server 223, the relevant entities perform the pre-relocation operations accordingly.

At step 314 of FIG. 7, when the relocation is triggered, SCA client 214 determines the target edge node 242 for relocation and informs SCA server 223 on serving edge node 221. The relocation may then be performed between serving edge node 221 and target edge node 242.

At step 315 of FIG. 7, SCA client 214/SCA server 223 may send a notification to SCA servers of the unselected candidate nodes and instruct them to release the resources reserved for the relocation during pre-relocation or revert the pre-relocation operations as defined in the pre-relocation operation.

At step 316 of FIG. 7, after receiving the notification and instruction of step 315, SCA servers of the unselected candidate nodes may release the resources reserved for the relocation or revert the pre-relocation operations.

Relocation within candidate group: In some cases, the relocation is performed among a fixed group of edge nodes. For example, to achieve balanced workload, a group of edge nodes may monitor each other's workload and relocate an EAS 222 from a heavily loaded edge node to a lightly loaded one. In another example, to achieve a certain level of reliability, multiple edge nodes may form a group where each node serves as a back-up for the others in case one edge node is offline or may not provide satisfying service.

Figure 8:
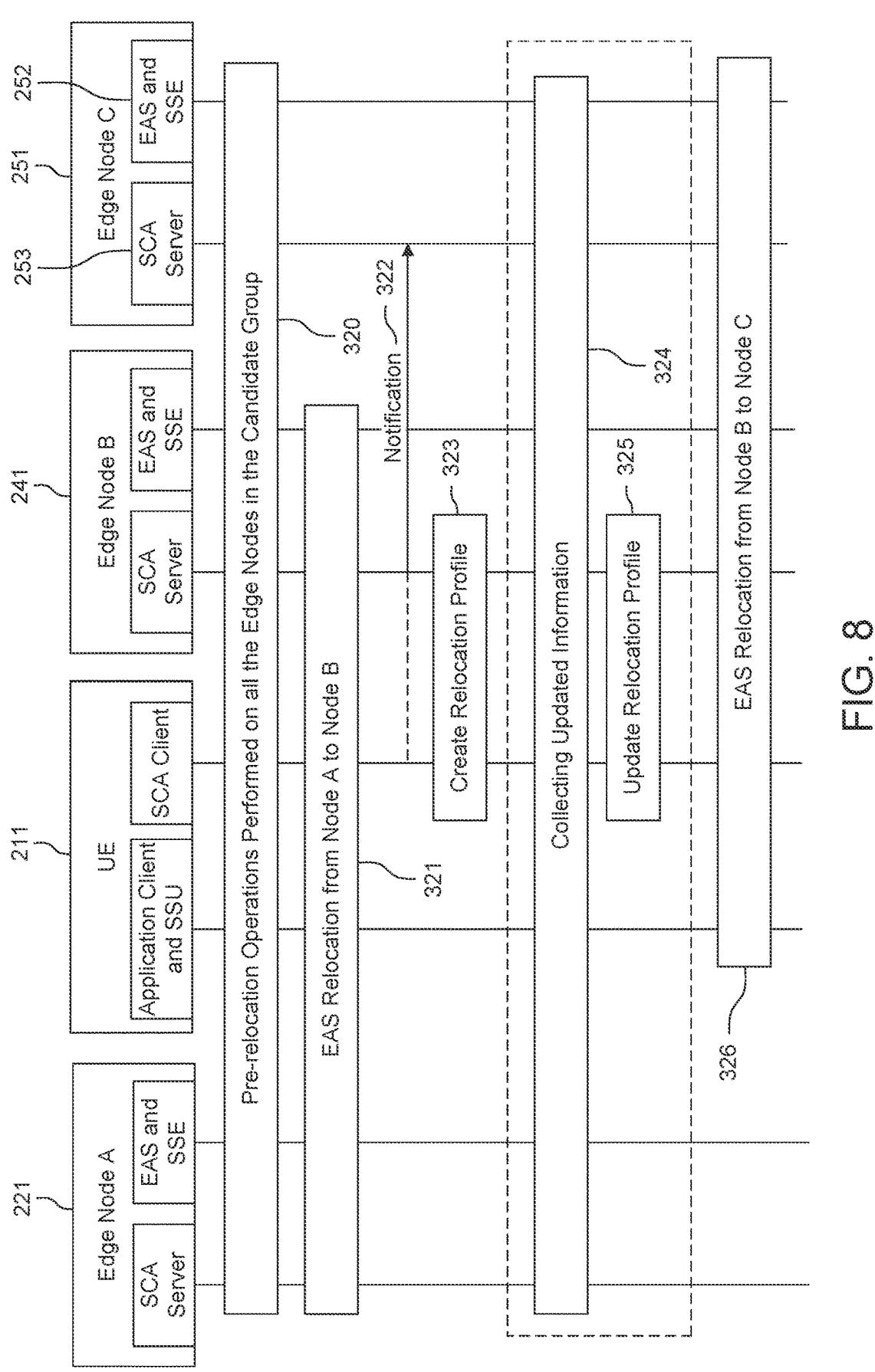
FIG. 8 illustrates an exemplary relocation within Candidate Group.

In these examples, the edge nodes may form a group and the relocations performed within this group of edge nodes may share a common candidate list or candidate group. For the relocations performed within the group, information of one relocation profile may be shared and reused by the others. Moreover, each edge node in the candidate group may maintain the pre-relocation status so that it does not have to repeated for a new relocation within the group. Example of proactive relocation with a fixed group of candidate edge nodes and repeated relocation within the group is shown in FIG. 8. (Some and procedures are omitted from the figure as they are the same as the general case.)

Pre-conditions: The relocation of a certain EAS 222 may be repeatedly performed in a fixed group of edge nodes (edge node 221, edge node 241, or edge node 251)

At step 320 of FIG. 8, the pre-relocation operations for the relocation of the EAS 222 may be performed on the edge nodes in the group. The relocation profile may be shared among the SCA servers in the group.

At step 321 of FIG. 8, the relocation may be performed from edge node 221 to edge node 241. After the relocation, edge node 221 may not remove the information related to the relocated EAS, since the EAS may be relocated back to edge node 221 in the future. The connection between UE 211 and edge node 221 may also be maintained, which can be viewed as the pre-relocation operation of a future relocation.

At step 322 of FIG. 8, SCA client 214 or SCA server 223 may send a notification to SCA server 253 of edge node 251 who is not involved in the relocation. SCA client 214 (or an SCA server) may instruct edge node 251 to maintain or partially maintain the pre-relocated status as it is still the candidate for a potential relocation. (Partially maintaining the pre-relocated status means that the candidate edge node may revert some of the pre-relocation operations.)

At step 323 of FIG. 8, a new relocation profile may be created by SCA client 214 or the SCA server 243 at edge node 241 since the serving edge node has changed to edge node 241. However, the relocation profile may reuse most of the information from the previous profile (where edge node 221 was the serving node), such as candidate profiles, trigger criteria, and monitoring operation. The SCA client 214/server may update the serving node information, and add edge node 221 back to the candidate list.

At step 324 of FIG. 8, similar to step 319 of FIG. 6, the SCA may continue monitoring the status of application client 212, serving edge node (e.g., edge node 241), and the candidate edge nodes (e.g., edge node 221, edge node 251) for detecting the trigger event or any updated information. The new relocation profile may be shared with the candidate edge nodes by updating the profile shared during pre-relocation. After receiving the new relocation profile, the SCA server at a candidate edge node may send particular information of the candidate edge node as defined in the monitoring operation or send a trigger notification to the serving edge node or UE 211 based on the trigger criteria.

At step 325 of FIG. 8, similar to step 310 of FIG. 6, the SCA may update the candidate profile with the updated information and predict the timing of the next relocation.

At step 326 of FIG. 8, the next relocation may be triggered, and then the relocation is performed between edge node 241 and the new target edge node.

Figure 9:
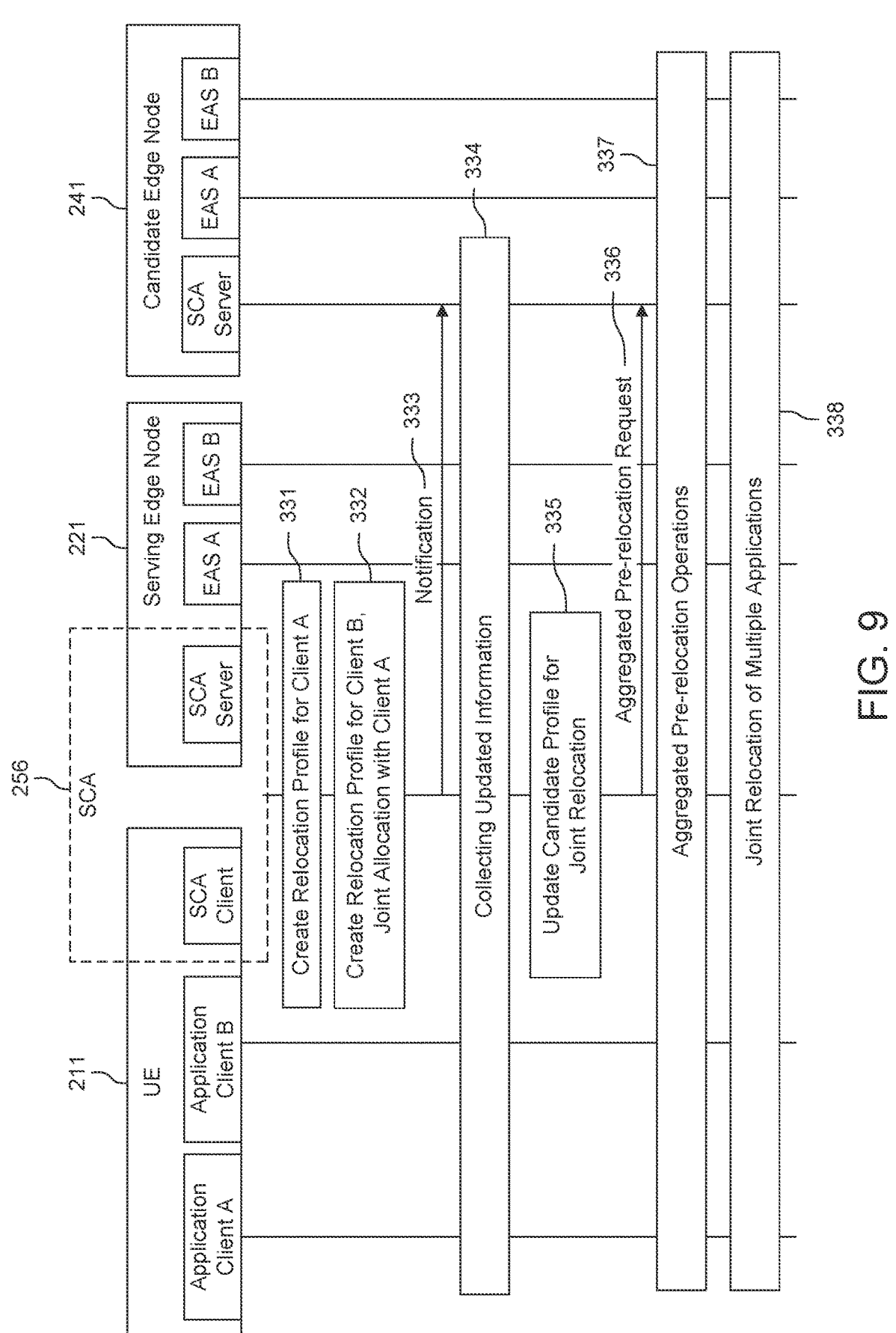
FIG. 9 illustrates an exemplary multi-Application Joint Relocation (Single UE)

Multi-Application Joint Relocation: Application clients 212 on the same UE 211 may share the same timing or target edge nodes for the relocations of the corresponding EASs. A joint relocation may be applied to reduce the communication and management overhead or balancing the workload of edge nodes. An example of multi-application joint relocation is shown in FIG. 9. (Some entities and procedures are omitted from the figure for ease of expression.)

At step 331 of FIG. 9, a relocation profile is created by SCA 256 (client or server) for the EAS associated with Application Client A. SCA 256 determines the trigger criteria and starts to monitor the candidate edge nodes 241, as described in FIG. 5.

At step 332 of FIG. 9, when a new relocation profile is created for the EAS associated with Application Client B, SCA 256 checks the existing relocation profile associated with the same UE 211 and the same relocation event type. If an existing relocation profile is found, SCA 256 may determine whether a joint relocation may be performed. Once a joint relocation is determined, the new relocation profile may reuse the information from the existing relocation profile. For example, the relocation instances in a joint relocation may share the same trigger criteria, or the same candidate list, or both.

At step 333 of FIG. 9, since the profiles of the joint relocation may share the same candidate list and monitoring operation, SCA 256 may send a notification to each candidate edge node 241 and instruct them to perform the defined monitoring operations for multiple applications.

At step 334 of FIG. 9, SCA 256 monitors the candidate edge nodes 241 and the application information for joint relocation. SCA 256 may aggregate the message exchanging associated with different relocation instances within the joint relocation.

At step 335 of FIG. 9, SCA 256 may update the relocation profiles with the information obtained from step 334. When updating a candidate profile, SCA 256 may evaluate whether the candidate edge node is capable of supporting all the applications in the joint relocation. If a single edge node is not capable of supporting all the applications in the joint relocation, the SCA may assign EASs of different applications to be relocated to different edge nodes. For example, SCA 256 may modify the candidate lists associated with two applications to be exclusive to each other. When predicting the timing of the relocation, the prediction for one application may be reused by other applications within the joint relocation.

At step 336 of FIG. 9, since the pre-relocation operations defined in different relocation profiles in the joint relocation may be the same, SCA 256 may send an aggregated pre-relocation request to the candidate edge nodes 241.

At step 337 of FIG. 9, when performing the pre-relocation operations, the same operation associated with different applications may be aggregated or performed at the same time. For example, if the pre-relocation is to establish connection between UE 211 and candidate edge node 241, the operation may only need to be performed once even if it is defined in multiple relocation profiles. If the pre-relocation operation is to share the application client's information with candidate edge node 241, then the information of multiple application clients within the joint relocation may be aggregated into one message and sent to candidate edge node 241. The profiles of the relocation instances in the joint relocation may be shared with candidate edge nodes 241 so that a candidate edge node 241 may determine whether it is capable of supporting the relocations for the applications (e.g., some or all) and if/when the relocations may be triggered.

At step 338 of FIG. 9, applications belonging to the joint relocation may share the same trigger criteria and may be triggered at the same time. When the relocations for the applications in the joint relocation are triggered, the context transfer associated with different applications may be aggregated. If the trigger criteria are different for different applications in a joint relocation, the detection of the first trigger may trigger the relocation of the EASs associated with the other applications belonging to the joint relocation.

Multi-UE Joint Relocation

Figure 10:
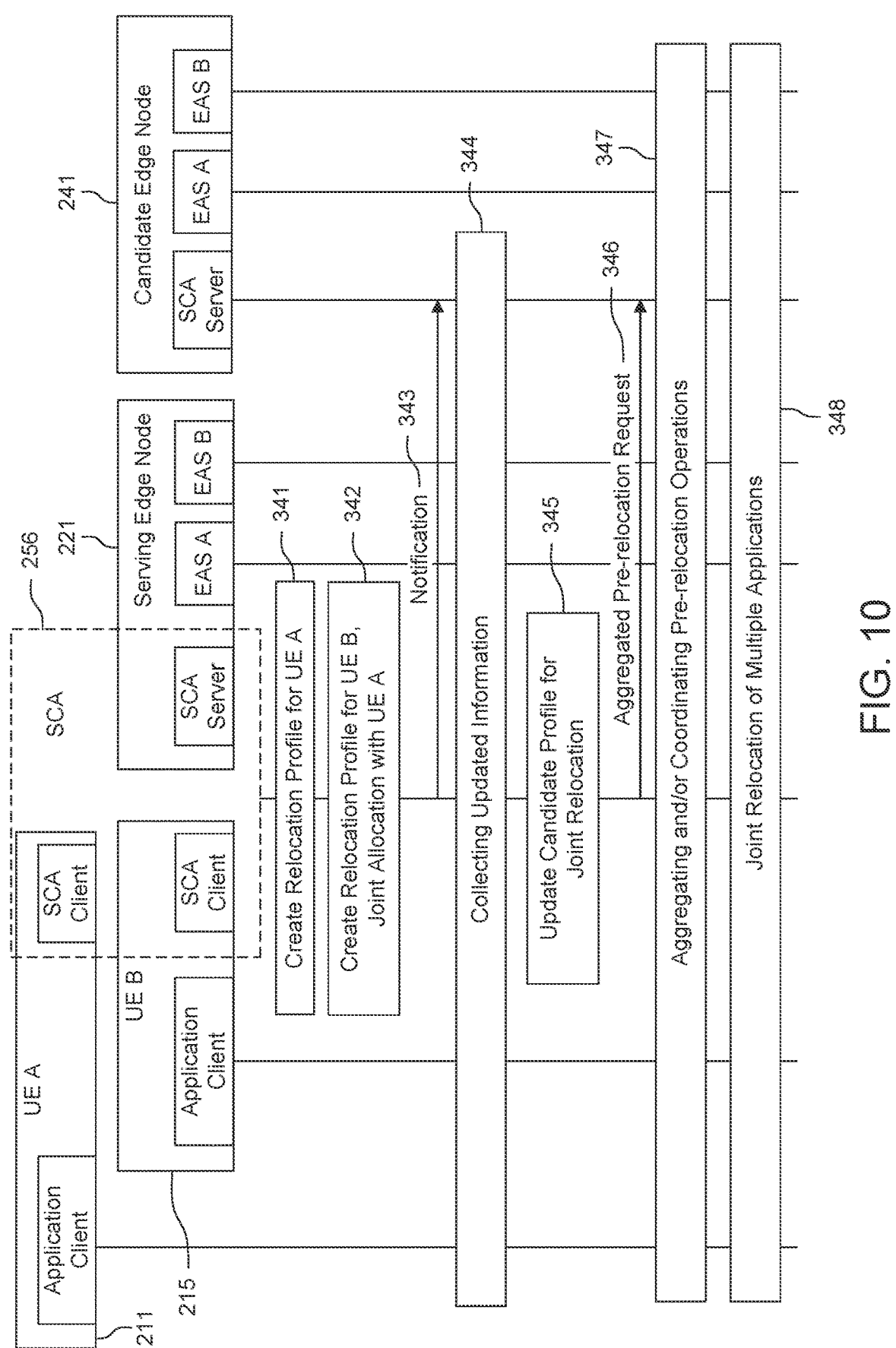
FIG. 10 illustrates an exemplary multi-UE Joint Relocation.

Application clients on multiple UEs may share the same timing or target edge nodes for the relocations of the corresponding EASs. For example, UEs 211 served by the same edge node may require application relocation simultaneously when the serving edge node 221 is scheduled to go offline or is overloading. Similar as the multi-application joint relocation, a joint relocation may be applied to multiple UEs, as shown in FIG. 10. (Some entities and procedures are omitted from the figure for ease of expression).

At step 341 of FIG. 10, a relocation profile is created by SCA 256 (client or server) for the EAS 222 associated with the application client 212 on UE A. SCA 256 determines the trigger criteria and starts to monitor the candidate target nodes 241, as described in FIG. 5.

At step 342 of FIG. 10, when a new relocation profile is created for the EAS 222 associated with an application client on UE B, SCA 256 checks the existing relocation profile associated with the same serving edge node and the same relocation event type. If an existing relocation profile is found, SCA 256 may determine whether a joint relocation may be performed. Once a joint relocation is determined, the new relocation profile may reuse the information from the existing relocation profile. For example, the relocation instances in a joint relocation may share the same trigger event such as "workload at the serving edge node exceeds a threshold", or the same candidate list, or both.

At step 343 of FIG. 10, since the profiles of the joint relocation may share the same candidate list and monitoring operation, SCA 256 may send a single notification to each candidate edge node 241 and instruct the latter to perform the defined monitoring operations for multiple UEs.

At step 344 of FIG. 10, SCA 256 may monitor the candidate nodes and the application information for joint relocation. SCA 256 may aggregate the message exchanging associated with different relocation instances within the joint relocation.

At step 345 of FIG. 10, SCA 256 may update the relocation profiles with the information obtained from step 344 of FIG. 10. When updating a candidate profile, SCA 256 may evaluate whether the candidate edge node 241 is capable of supporting applications from the UEs in the joint relocation. If a single edge node is not capable of supporting the applications of the UEs in the joint relocation, SCA 256 may assign EASs of different UE's applications to be relocated to different edge nodes. For example, SCA 256 may modify the candidate lists associated with two UEs to be exclusive to each other. When predicting the timing of the relocation, the prediction for one application may be reused by other applications within the joint relocation.

At step 346 of FIG. 10, since the pre-relocation operations defined in different relocation profiles in the joint relocation may be the same, SCA 256 may send an aggregated pre-relocation request to the candidate edge nodes.

At step 347 of FIG. 10, when performing the pre-relocation operations, the same operation associated with applications at different UEs may be aggregated. For example, if the pre-relocation operation is to share the EASs' information at the serving edge node 221 with the candidate edge node 241, then the information of multiple EASs within the joint relocation may be aggregated into one message and sent to candidate edge node 241. SCA 256 may also coordinate or stagger the pre-relocation operations associated with different UEs to avoid congestion caused by multiple UEs establishing connections with the same edge node simultaneously. For example, SCA 256 may instruct different UEs to establish connections with different candidate edge nodes 241 if these operations are defined at the same timing/trigger. The profiles of the relocation instances in the joint relocation may be shared with the candidate edge nodes 241 so that a candidate edge node 241 may determine whether it is capable of supporting the relocations for the UEs (e.g., some or all) and if/when the relocations may be triggered.

At step 348 of FIG. 10, relocations associated with multiple UEs belonging to the joint relocation may share the same trigger event. If the trigger events are different for the UEs in a joint relocation, the detection of the first trigger event may trigger the relocation associated with all the other UEs belonging to the joint relocation. If the relocation instances of the joint relocation are targeting on the same edge node, the context transfer associated with different UEs may be aggregated.

3GPP SA6 Embodiment

Figure 11:
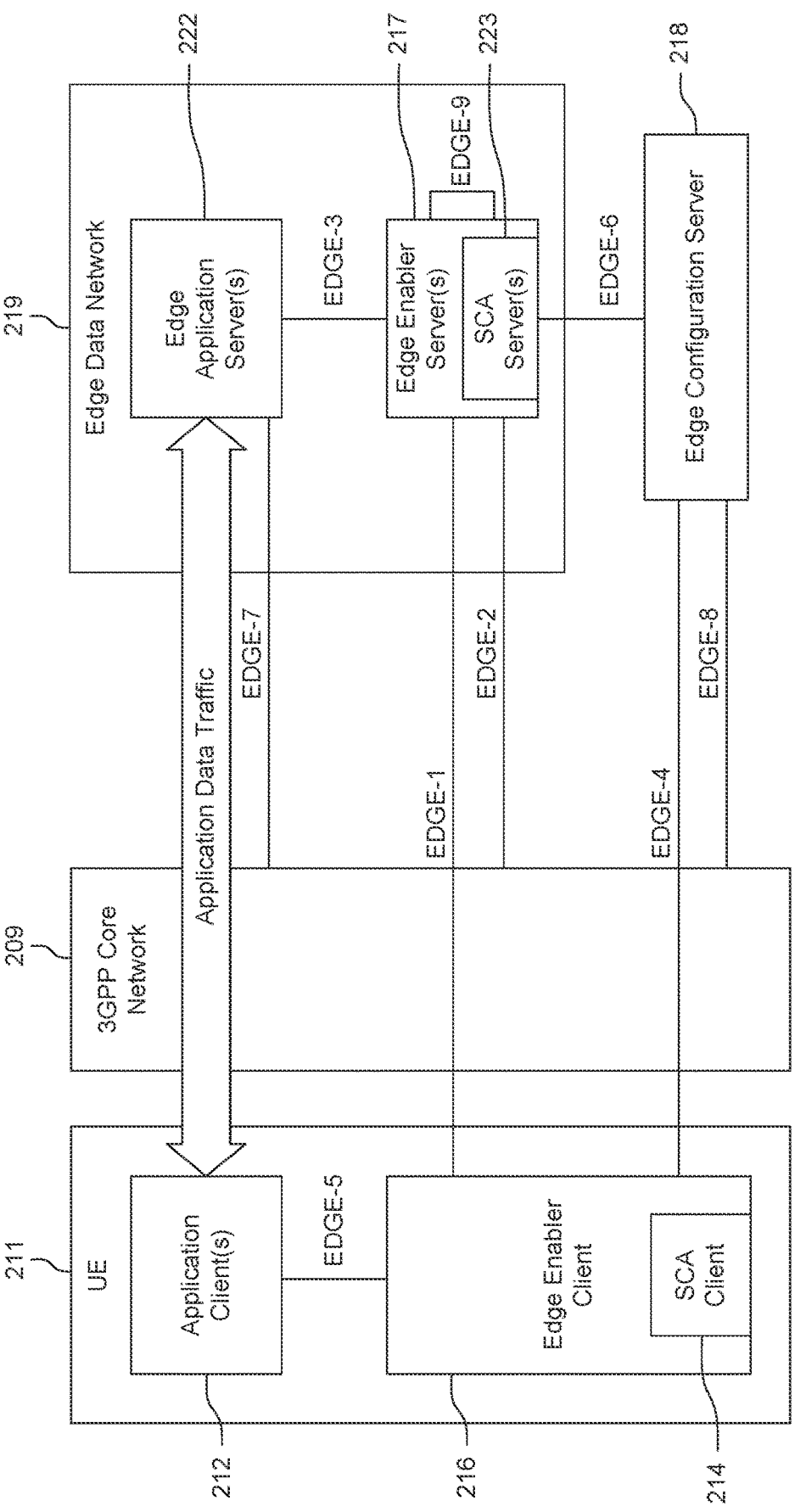
FIG. 11 illustrates a first exemplary 3GPP SA6 Embodiment.

The disclosed SCA service and function may be realized as an enhancement to the edge enablement functions defined in 3GPP SA6, where SCA server 223 may be co-deployed with the Edge Enabler Server, and SCA client 214 may be co-deployed with the Edge Enabler Client, as shown in FIG. 11.

The interactions between the other entities and the SCA server 223 or SCA client 214 (as disclosed in the procedures herein, such as FIG. 4-FIG. 10 and associated descriptions) can be implemented by enhancing the existing reference points defined by 3GPP SA6.

EDGE-1: The enhanced EDGE-1 reference point will enable the interaction between the SCA server 223 and SCA client 214 for sharing the information obtained by either side, such as sharing the application client 212 information with the Edge Enabler Server 217 or sharing the Edge Application Server information with the Edge Enabler Client 216 to support the relocation services.

EDGE-2: The enhanced EDGE-2 reference point may support the interaction between the SCA server 223 and the 3GPP Core Network 209 for services provided by the Core Network (e.g., SSC 232).

EDGE-3: Via the enhanced EDGE-3 reference point, SCA server 223 may obtain information from the Edge Application Server(s) 222, which may be used for monitoring relocation trigger event, predicting relocation timing, or shared with SCA client 214.

EDGE-4: The enhanced EDGE-4 reference point enables the interaction between SCA client 214 and the Edge Configuration Server 218 (e.g., SSE 224 or SSC 232), through which the SCA client 214 may obtain information of the other Edge Enabler Servers 217 and Edge Application Servers 222 to perform pre-relocation operations.

EDGE-5: The enhanced EDGE-5 reference point is used for obtaining information from the application client 212 by SCA client 214, which may be used for monitoring relocation trigger event, predicting relocation timing, or shared with the SCA server 223.

EDGE-6: The enhanced EDGE-6 reference point enables the interaction between the SCA server 223 and the Edge Configuration Server 218 (e.g., SSE 224 or SSC 232), through which the SCA server 223 may obtain information of the other Edge Enabler Servers 217 to build the neighbor list or monitor the status of candidate edge nodes 241.

EDGE-9: The enhanced EDGE-9 reference point is used by the SCA server 223 to obtain information from the other Edge Enabler Servers 217 for the purpose of creating neighbor list, monitoring candidate edge nodes, or performing pre-relocation operations.

Figure 12:
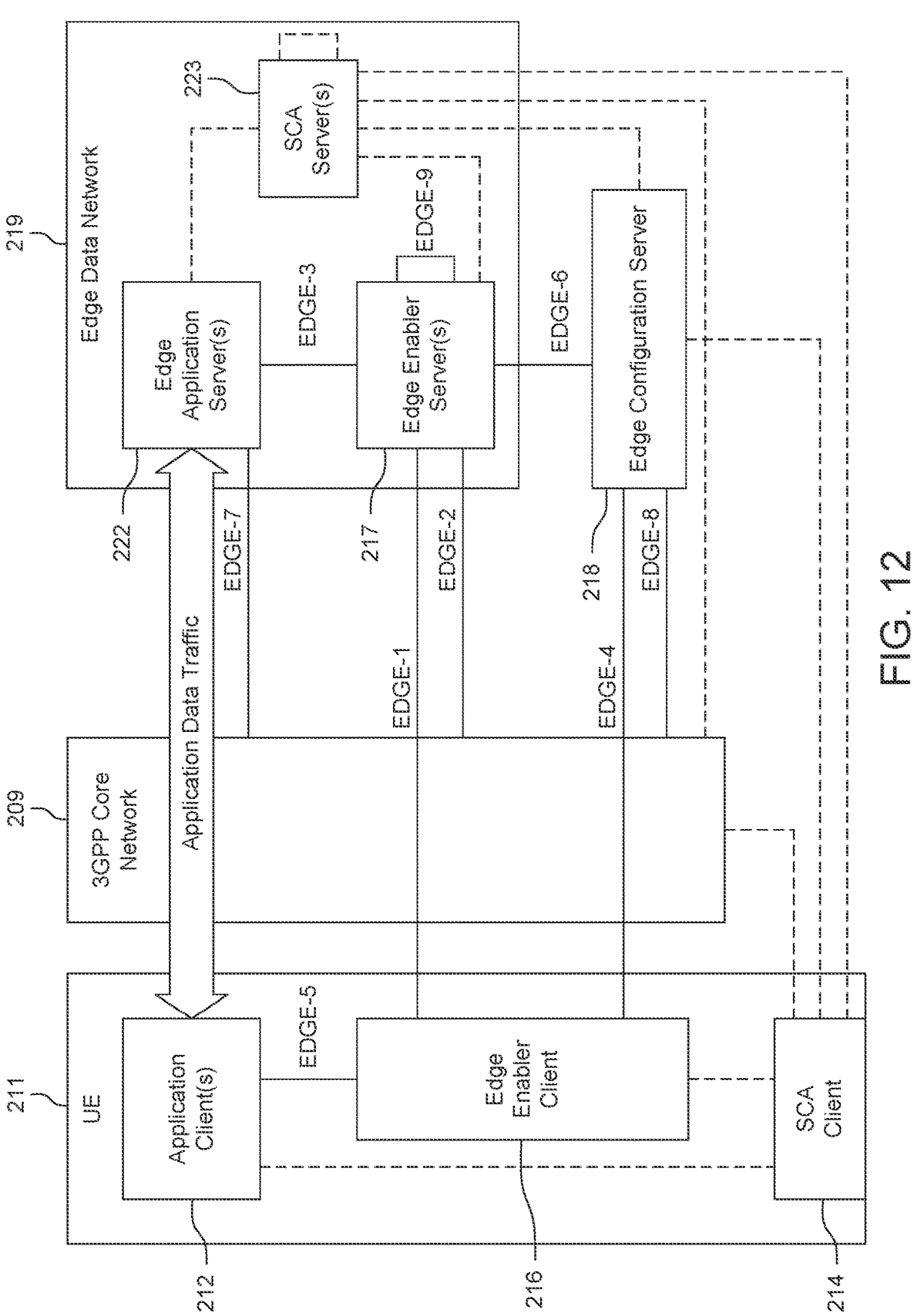
FIG. 12 illustrates a second exemplary 3GPP SA6 Embodiment.

Alternatively, the disclosed SCA service and function may be realized as a stand-alone function in addition to the edge enablement functions defined in 3GPP SA6, where SCA server 223 may be realized as a new function in the Edge Data Network 219, and the SCA client 214 may be realized as a new function in the UE 211, as shown in FIG. 12.

In FIG. 12, the Edge Enabler Client corresponds to the SSU 213, the Edge Enabler Server corresponds to the SSE, the Edge Configuration Server and the 3GPP Core Network 209 corresponds to the SSC. The SCA functionality may be realized by defining new reference points as indicated by the dashed lines. (The descriptions of the new reference points may refer to the descriptions herein, such as FIG. 4-FIG. 10 and associated descriptions).

In addition, the information elements defined in SA6 may be reused and expanded to support the information elements disclosed herein, such as the AC profile, EAS profile, or EES profile.

Figure 13:
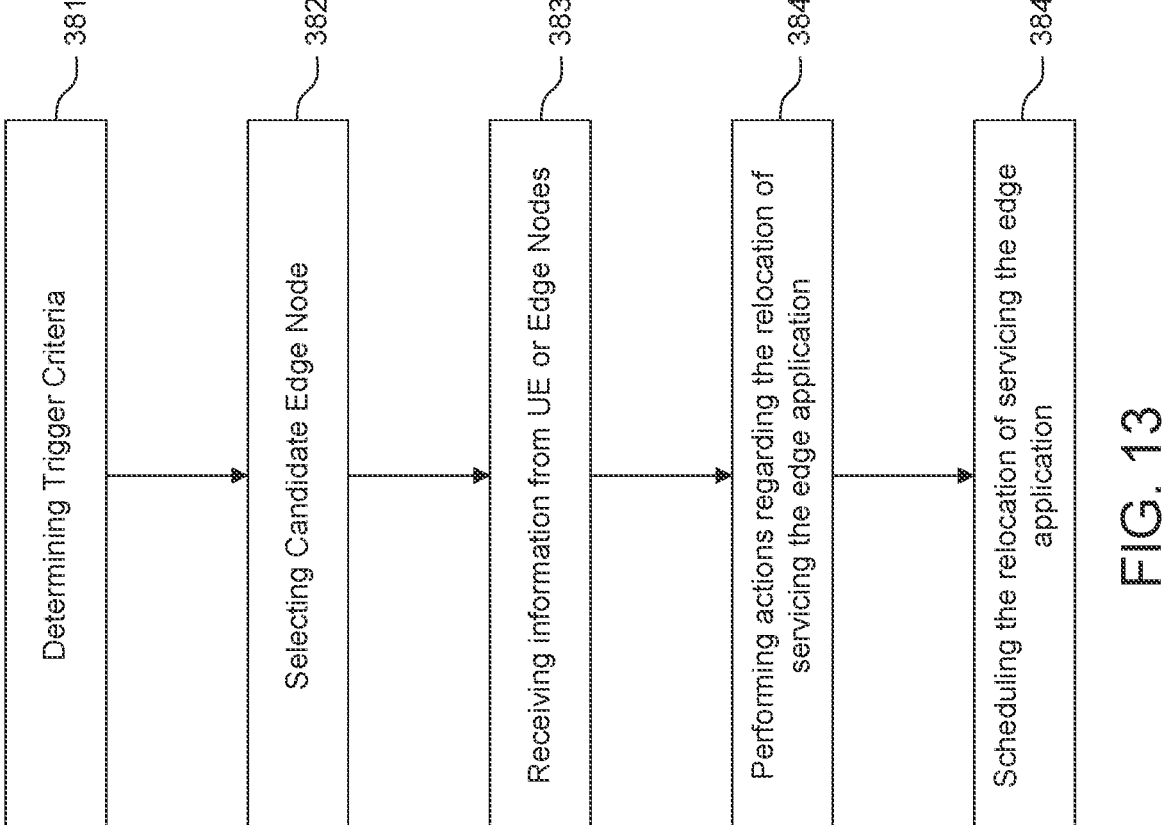
FIG. 13 illustrated an exemplary method of the disclosed SCA functionality.

FIG. 13 illustrated an exemplary method of the disclosed SCA functionality. At step 381, determining trigger criteria for relocation of servicing an edge application of UE 211 from a first edge application server to a second edge application server. The first edge application server (e.g., SCA server 223) may be hosted on serving edge node 221 and the second edge application server (e.g., SCA server 243) may be hosted on candidate edge node 241.

At step 382, selecting the candidate edge node 241 with which the relocation of servicing the edge application of UE 211 may be performed. At step 383, receiving one or more messages from at least one of UE 211, serving edge node 221, or candidate edge node 241. The messages may include information related to the relocation of servicing the edge application of UE 211. For example, the information related to the relocation of the servicing the edge application may include information from the edge application, information service from another edge application server 243 hosted on another edge node 241 (e.g., referred herein as candidate edge node 241).

Figure 14:
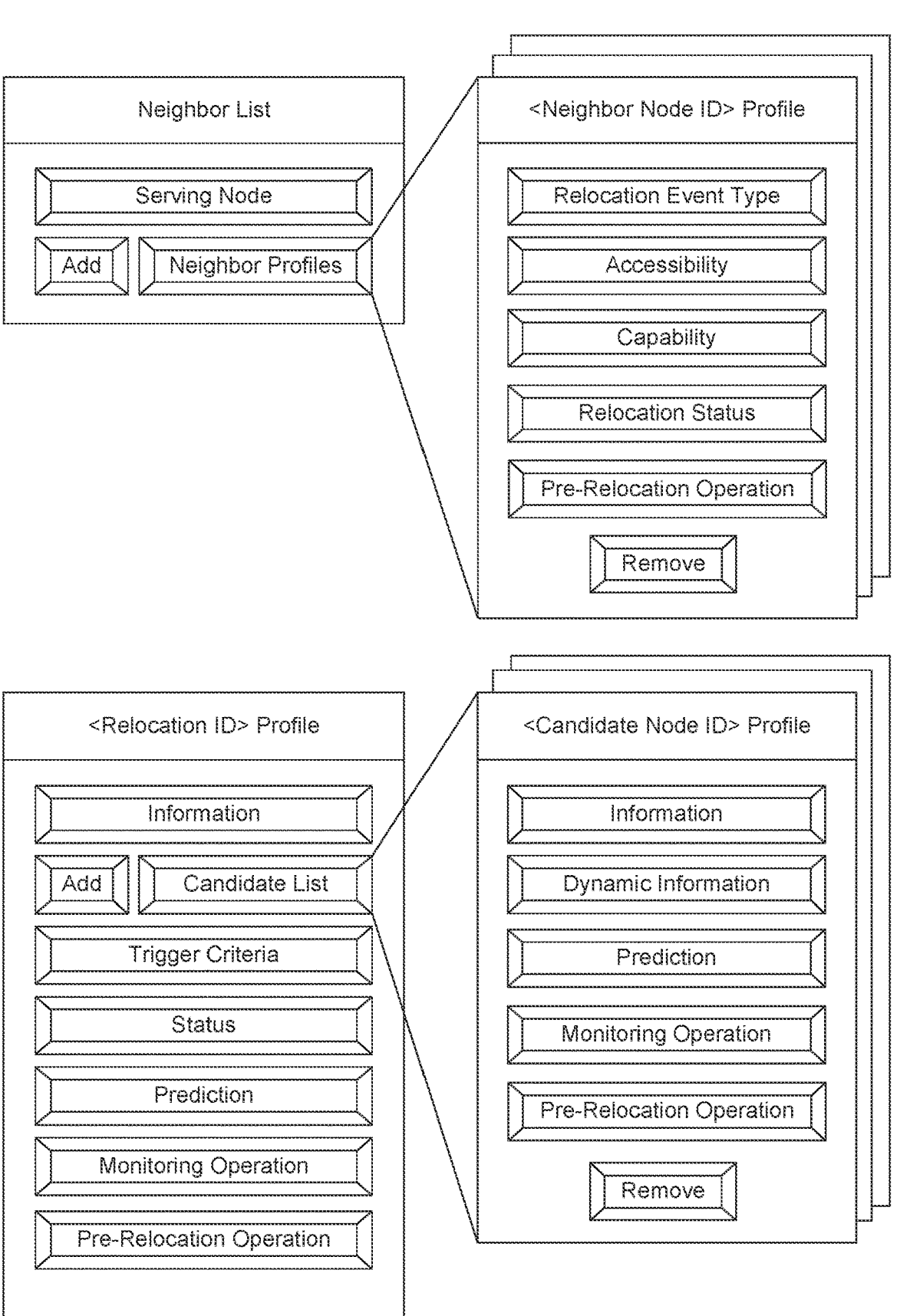
FIG. 14 illustrates an exemplary graphical user interface (GUI) for configuring neighbor list and relocation profile.

FIG. 14 shows an example GUI that may be used by an operator to configure and manage the neighbor list, neighbor profile, relocation profile, or candidate profile for the disclosed SCA functionality defined in this paper.

It is understood that the entities performing the steps illustrated herein, such as FIG. 4-FIG. 14, may be logical entities. The steps may be stored in a memory of, and executing on a processor of, a device, server, or computer system such as those illustrated in FIG. 15F or FIG. 15G. Skipping steps, combining steps, or adding steps between exemplary methods disclosed herein (e.g., FIG. 4-FIG. 14) is contemplated. Table 6 and Table 7 provides abbreviations and terms and associated definitions.

TABLE 6

| Abbreviations and Definitions | |
|---|---|
| Abbreviations | Definitions |
| EAS | Edge Application Server |
| SCA | Service Continuity Assistance |
| ESC | Edge Support and Coordination |
| SSU/SSE/SSC | Supportive Service - UE/Edge/Core |

TABLE 7

| Terms and Definitions | |
|---|---|
| Terms | Definitions |
| Edge Node | The physical host of edge application servers, providing resources and services to the edge application servers. |
| Application Client | The client of the application hosted on the UE. |
| Edge Application Server (EAS) | The server of the application instantiated on the Edge Node. |
| Relocation | When the application client on the UE prefers a new Edge Node to host the corresponding EAS, the EAS will be relocated to or instantiated on the new Edge Node, and the associated application context will be transferred to the new Edge Node. |
| Service Continuity Assistance (SCA) | The service and function disclosed herein for managing and enhancing the relocation of edge application server. |
| Supportive Service | Services hosted on the UE / Edge Node / Core Network that may provide supporting functions needed for the relocation and SCA. | of UE 211, information of serving edge node 221, information of candidate edge node 241, or a performance measurement of the edge application.

At step 384, sending instructions to candidate edge node 241 to perform actions regarding the relocation of servicing the edge application of UE 211. At step 385, based on the trigger criteria and the information related to the relocation of servicing the edge application of UE 211, scheduling the relocation of servicing the edge application of UE 211.

The method of FIG. 13 may be executed by UE 211, a serving edge node 221, or candidate edge node 241. As disclosed herein the method may be distributed over multiple devices.

Generally, as disclosed herein, an edge application may have its client 214 hosted on UE 211, which is receiving service from an edge application server 223 hosted on a serving edge node 221. In the event of a relocation, the client 214 may switch from the serving edge node 221 in order to The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 15A:
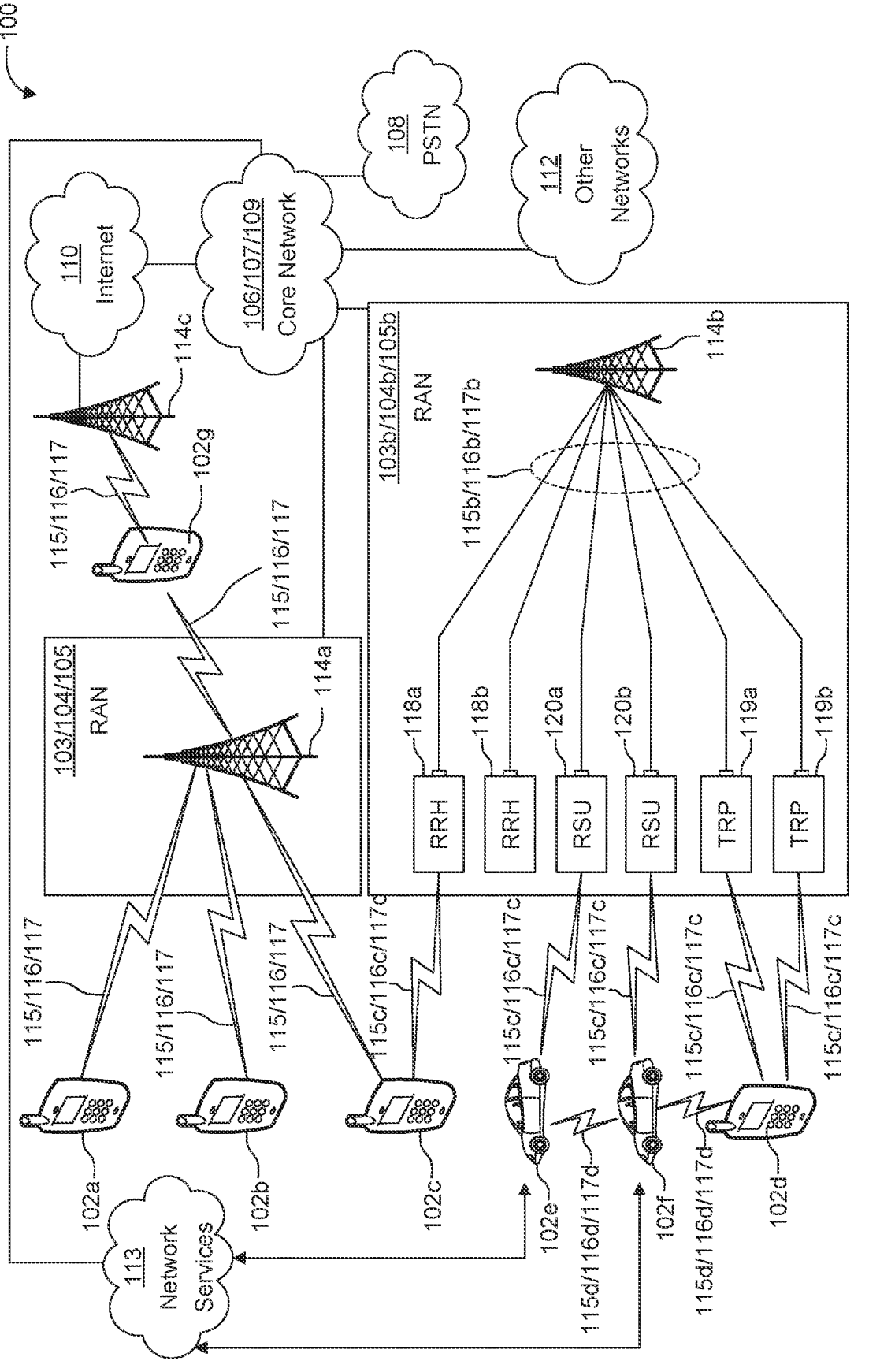
FIG. 15A illustrates an example communications system.

FIG. 15A illustrates an example communications system 100 in which the methods and apparatuses of enhanced edge application relocation, such as the systems and methods illustrated in FIG. 4 through FIG. 14 described and claimed herein may be used. The communications system 100 may include wireless transmit/receive units (WTRUs) 102a, 102b, 102c, 102d, 102e, 102f, or 102g (which generally or collectively may be referred to as WTRU 102 or WTRUs 102). The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102a, 102b, 102c, 102d, 102e, 102f, or 102g may be any type of apparatus or device configured to operate or communicate in a wireless environment. Although each WTRU 102a, 102b, 102c, 102d, 102e, 102f, or 102g may be depicted in FIG. 15A, FIG. 15B, FIG. 15C, FIG. 15D, FIG. 15E, or FIG. 15F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114a and a base station 114b. In the example of FIG. 15A, each base stations 114a and 114b is depicted as a single element. In practice, the base stations 114a and 114b may include any number of interconnected base stations or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, or the other networks 112. Similarly, base station 114b may be any type of device configured to wiredly or wirelessly interface with at least one of the Remote Radio Heads (RRHs) 118a, 118b, Transmission and Reception Points (TRPs) 119a, 119b, or Roadside Units (RSUs) 120a and 120b to facilitate access to one or more communication networks, such as the core network 106/107/109, the Internet 110, other networks 112, or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, or other networks 112

TRPs 119a, 119b may be any type of device configured to wirelessly interface with at least one of the WTRU 102d, to facilitate access to one or more communication networks, such as the core network 106/107/109, the Internet 110, Network Services 113, or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations or network elements (not shown), such as a Base Station Controller (BSC), a Radio Network Controller (RNC), relay nodes, etc. Similarly, the base station 114b may be part of the RAN 103b/104b/105b, which may also include other base stations or network elements (not shown), such as a BSC, a RNC, relay nodes, etc. The base station 114a may be configured to transmit or receive wireless signals within a particular geographic region, which may be referred to as a cell (not shown). Similarly, the base station 114b may be configured to transmit or receive wired or wireless signals within a particular geographic region, which may be referred to as a cell (not shown) for methods, systems, and devices of enhanced edge application relocation, as disclosed herein. Similarly, the base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, or 102f may communicate with one another over an air interface 115d/116d/117d, such as Sidelink communication, which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b, TRPs 119a, 119b, or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 or 115c/116c/117c may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114a in the RAN 103/104/105 and the WTRUs 102a, 102b, 102c, and 102g or RRHs 118a, 118b, TRPs 119a, 119b or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 15A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of enhanced edge application relocation, as disclosed herein. In an example, the base station 114c and the WTRUs 102, e.g., WTRU 102e, may implement a radio technology such as IEEE 802.11 to establish a wireless local area network (WLAN). similarly, the base station 114c and the WTRUs 102d, may implement a radio technology such as IEEE 802.15 to establish a wireless personal area network (WPAN). In yet another example, the base station 114c and the WTRUs 102, e.g., WTRU 102e, may utilize a cellular-based RAT (e.g., WCDMA, CDMA2000, GSM, LTE, LTE-A, NR, etc.) to establish a picocell or femtocell. As shown in FIG. 15A, the base station 114c may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, messaging, authorization and authentication, applications, or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 15A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links for implementing methods, systems, and devices of enhanced edge application relocation, as disclosed herein. For example, the WTRU 102g shown in FIG. 15A may be configured to communicate with the base station 114a, which may employ a cellular-based radio technology, and with the base station 114c, which may employ an IEEE 802 radio technology.

Although not shown in FIG. 15A, it will be appreciated that a User Equipment may make a wired connection to a gateway. The gateway maybe a Residential Gateway (RG). The RG may provide connectivity to a Core Network 106/107/109. It will be appreciated that much of the subject matter included herein may equally apply to UEs that are WTRUs and UEs that use a wired connection to connect with a network. For example, the subject matter that applies to the wireless interfaces 115, 116, 117 and 115c/116c/117c may equally apply to a wired connection.

Figure 15B:
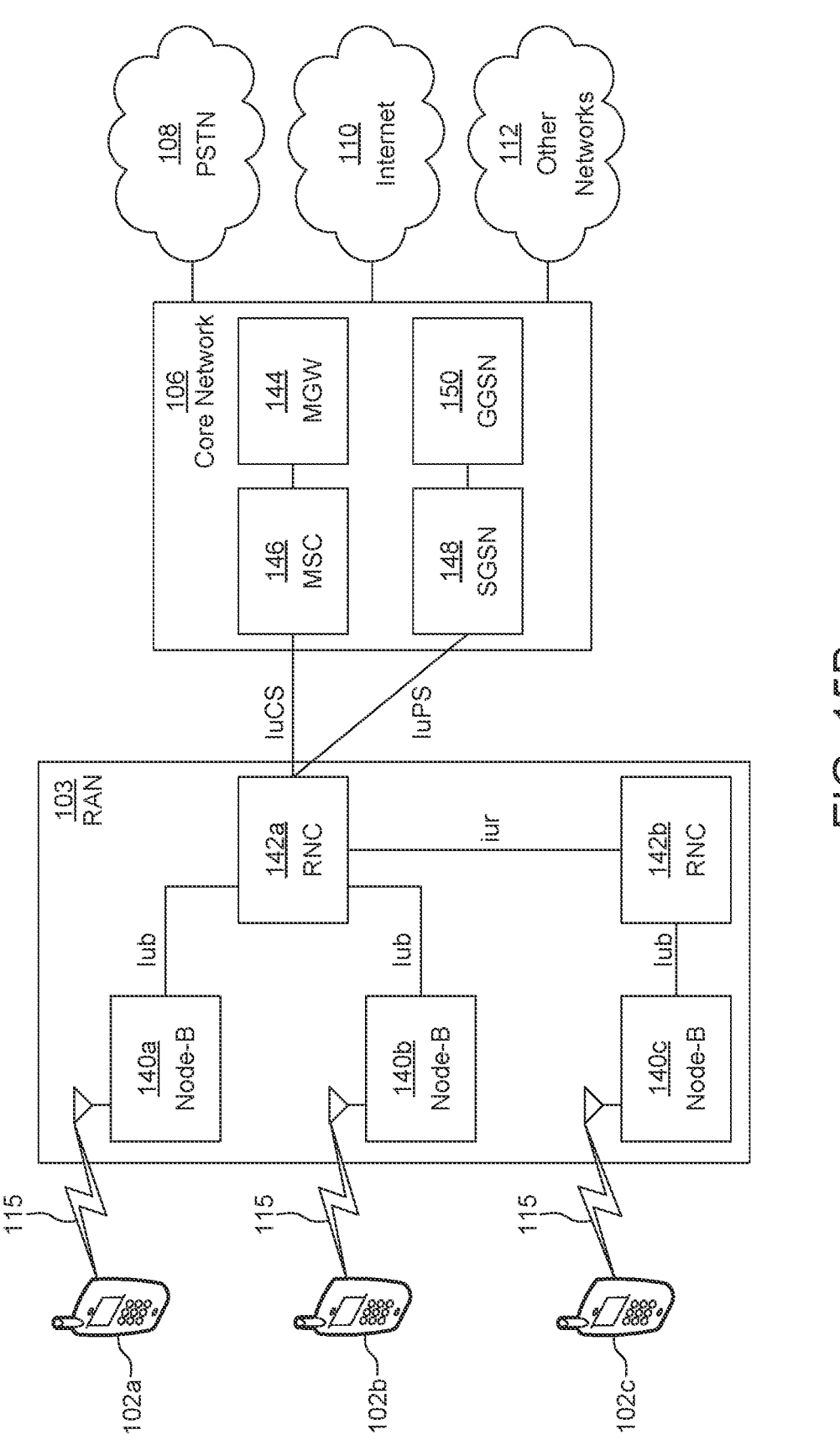
FIG. 15B illustrates an exemplary system that includes RANs and core networks.

FIG. 15B is a system diagram of an example RAN 103 and core network 106 that may implement methods, systems, and devices of enhanced edge application relocation, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 15B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 15B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 15B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 15C:
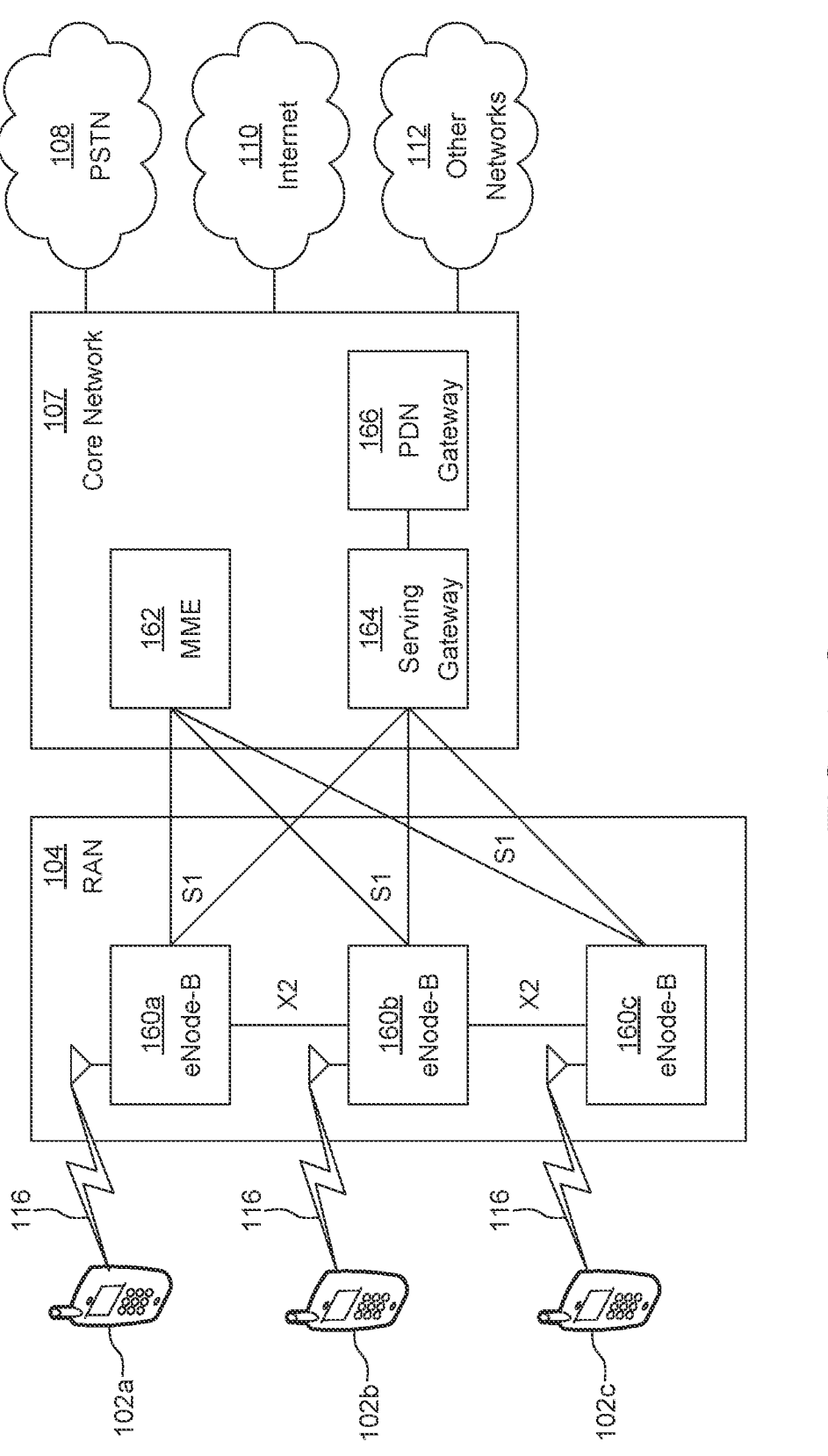
FIG. 15C illustrates an exemplary system that includes RANs and core networks.

FIG. 15C is a system diagram of an example RAN 104 and core network 107 that may implement methods, systems, and devices of enhanced edge application relocation, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 15C, the eNode-Bs 160a, 160b, and 160c may communicate with one another over an X2 interface.

The core network 107 shown in FIG. 15C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

Figure 15D:
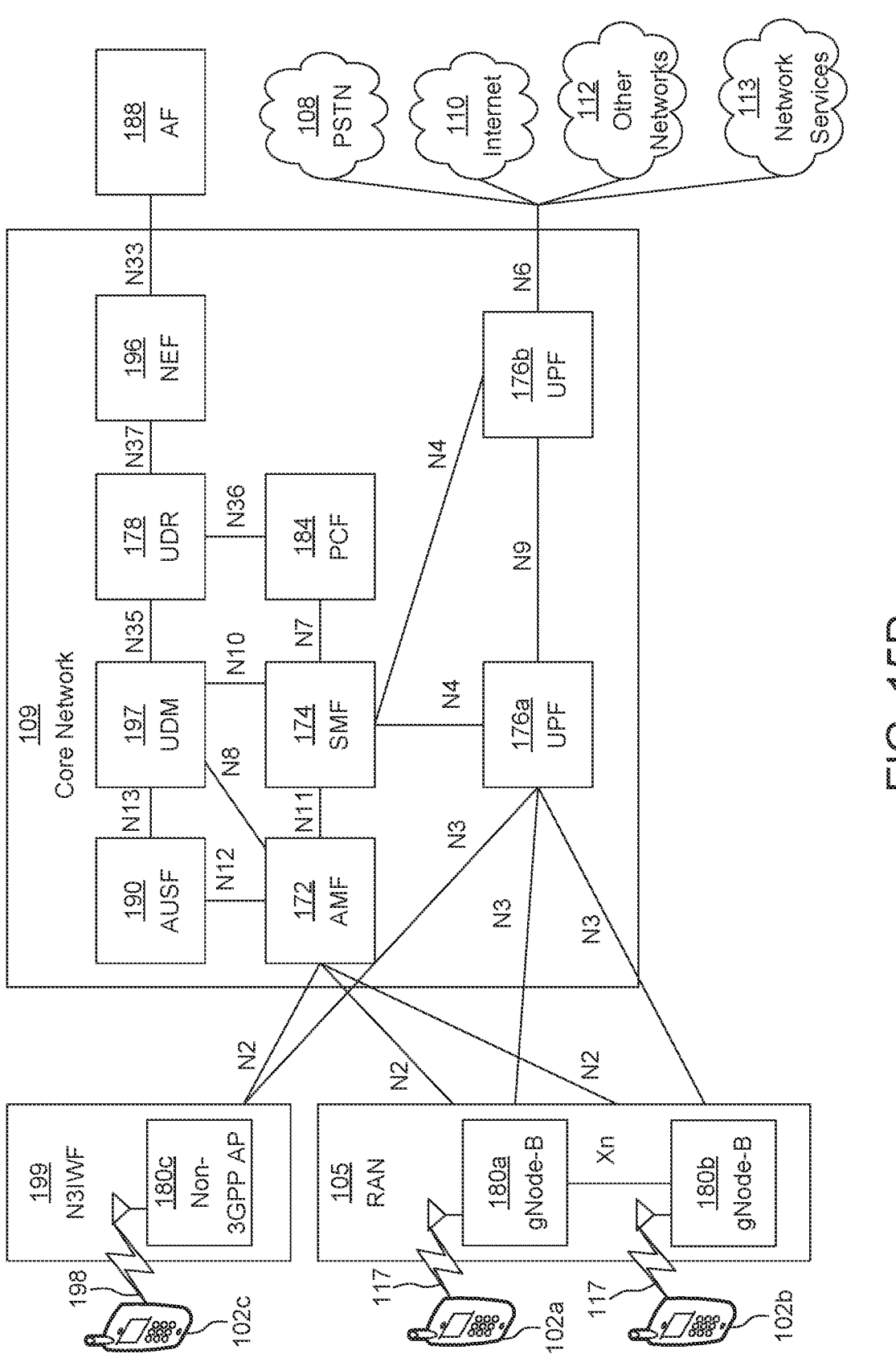
FIG. 15D illustrates an exemplary system that includes RANs and core networks.

FIG. 15D is a system diagram of an example RAN 105 and core network 109 that may implement methods, systems, and devices of enhanced edge application relocation, as disclosed herein. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 15D, the gNode-Bs 180a and 180b may communicate with one another over an Xn interface, for example.

The core network 109 shown in FIG. 15D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 15G.

In the example of FIG. 15D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 15D shows that network functions directly connect with one another, however, it should be appreciated that they may communicate via routing agents such as a diameter routing agent or message buses.

In the example of FIG. 15D, connectivity between network functions is achieved via a set of interfaces, or reference points. It will be appreciated that network functions may be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 15D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 15D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect with network functions, so that network function can add to, read from, and modify the data that is in the repository. For example, the UDR 178 may connect with the PCF 184 via an N36 interface. Similarly, the UDR 178 may connect with the NEF 196 via an N37 interface, and the UDR 178 may connect with the UDM 197 via an N35 interface.

The UDM 197 may serve as an interface between the UDR 178 and other network functions. The UDM 197 may authorize network functions to access of the UDR 178. For example, the UDM 197 may connect with the AMF 172 via an N8 interface, the UDM 197 may connect with the SMF 174 via an N10 interface. Similarly, the UDM 197 may connect with the AUSF 190 via an N13 interface. The UDR 178 and UDM 197 may be tightly integrated.

The AUSF 190 performs authentication related operations and connect with the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect with an AF 188 via an N33 interface and it may connect with other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that may be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 15D, in a network slicing scenario, a WTRU 102a, 102b, or 102c may connect with an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned or operated by other service providers.

The core network entities described herein and illustrated in FIG. 15A, FIG. 15C, FIG. 15D, or FIG. 15E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 15A, FIG. 15B, FIG. 15C, FIG. 15D, or FIG. 15E are provided by way of example only, and it is understood that the subject matter disclosed and claimed herein may be embodied or implemented in any similar communication system, whether presently defined or defined in the future.

Figure 15E:
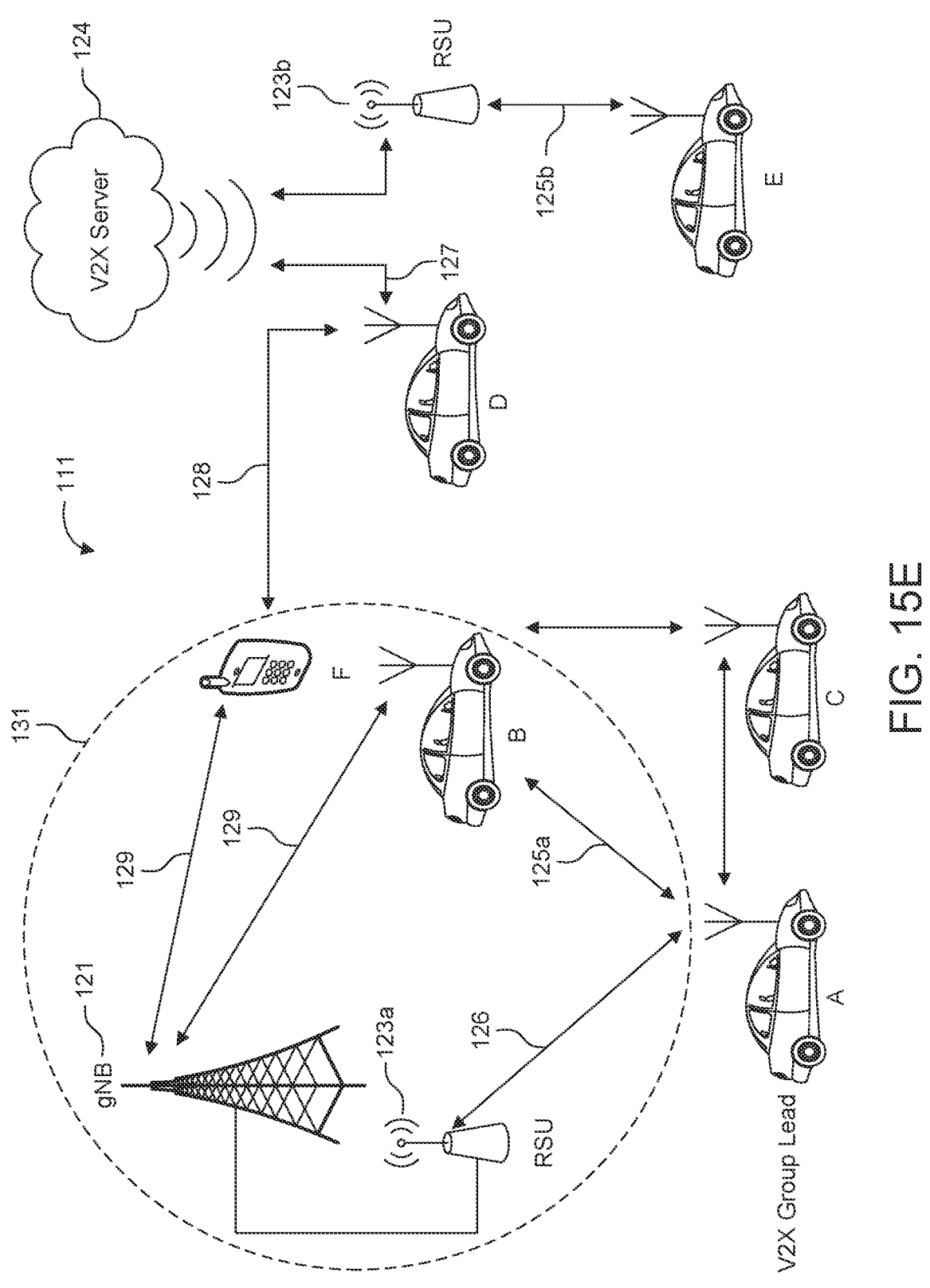
FIG. 15E illustrates another example communications system.

FIG. 15E illustrates an example communications system 111 in which the systems, methods, apparatuses that implement enhanced edge application relocation, described herein, may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 15E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 15E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 15F:
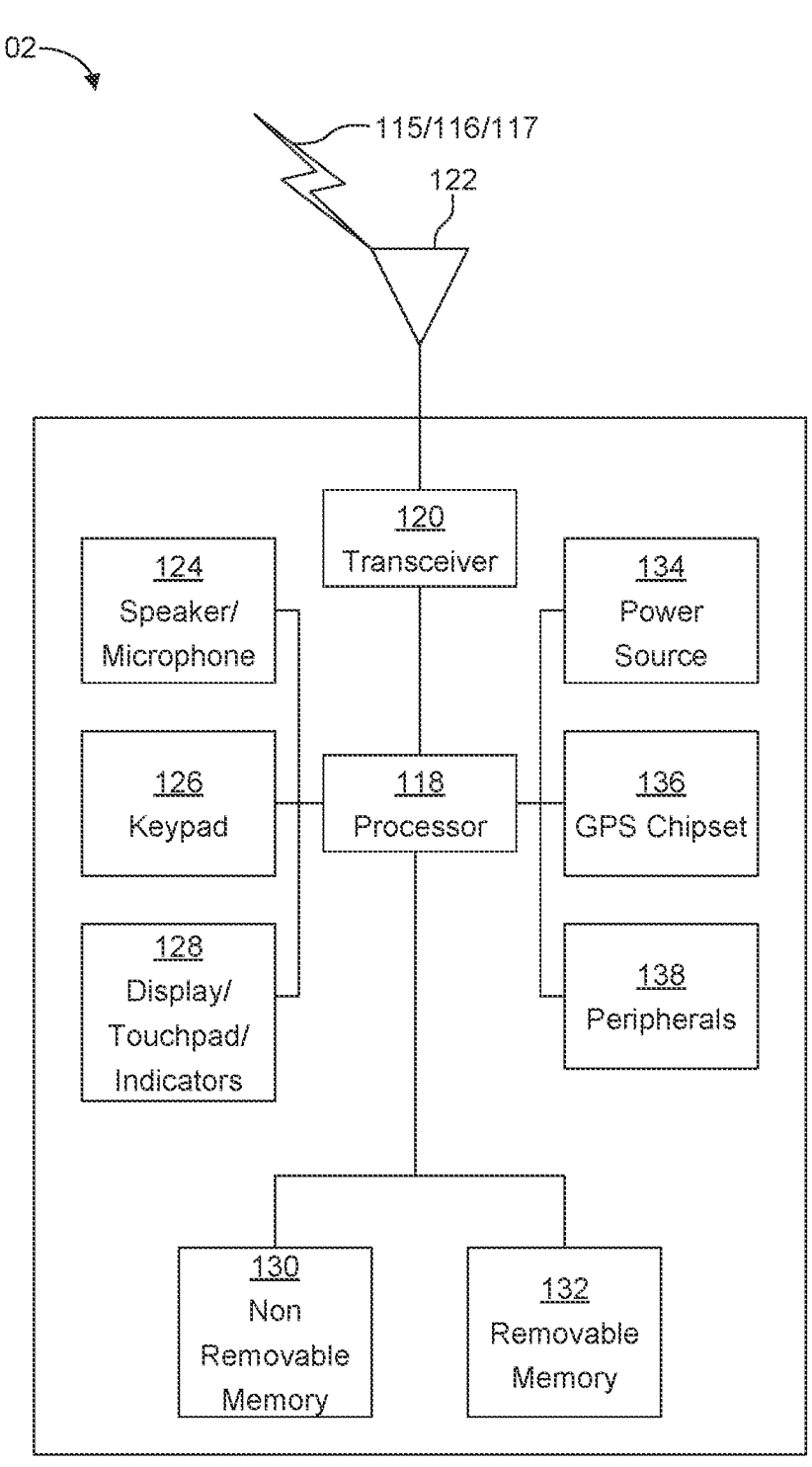
FIG. 15F is a block diagram of an example apparatus or device, such as a WTRU.

FIG. 15F is a block diagram of an example apparatus or device WTRU 102 that may be configured for wireless communications and operations in accordance with the systems, methods, and apparatuses that implement enhanced edge application relocation, described herein, such as a WTRU 102 of FIG. 15A, FIG. 15B, FIG. 15C, FIG. 15D, or FIG. 15E, or FIG. 4-FIG. 12. As shown in FIG. 15F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, or the nodes that base stations 114a and 114b may represent, such as to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 15F and may be an exemplary implementation that performs the disclosed systems and methods for device triggering described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 15F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 15A) over the air interface 115/116/117 or another UE over the air interface 115d/116d/117d. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 15F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether the setup of the tracking paging area in some of the examples described herein are successful or unsuccessful, or otherwise indicate a status of enhanced edge application relocation and associated components. The control lighting patterns, images, or colors on the display or indicators 128 may be reflective of the status of any of the method flows or components in the FIG.'s illustrated or discussed herein (e.g., FIG. 1-FIG. 14, etc.). Disclosed herein are messages and procedures of enhanced edge application relocation. The messages and procedures may be extended to provide interface/API for users to request resources via an input source (e.g., speaker/microphone 124, keypad 126, or display/ touchpad/indicators 128) and request, configure, or query enhanced edge application relocation related information, among other things that may be displayed on display 128.

The processor 118 may receive power from the power source 134 and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect with other components, modules, or systems of such apparatuses or devices via one or more interconnect interfaces, such as an interconnect interface that may comprise one of the peripherals 138.

Figure 15G:
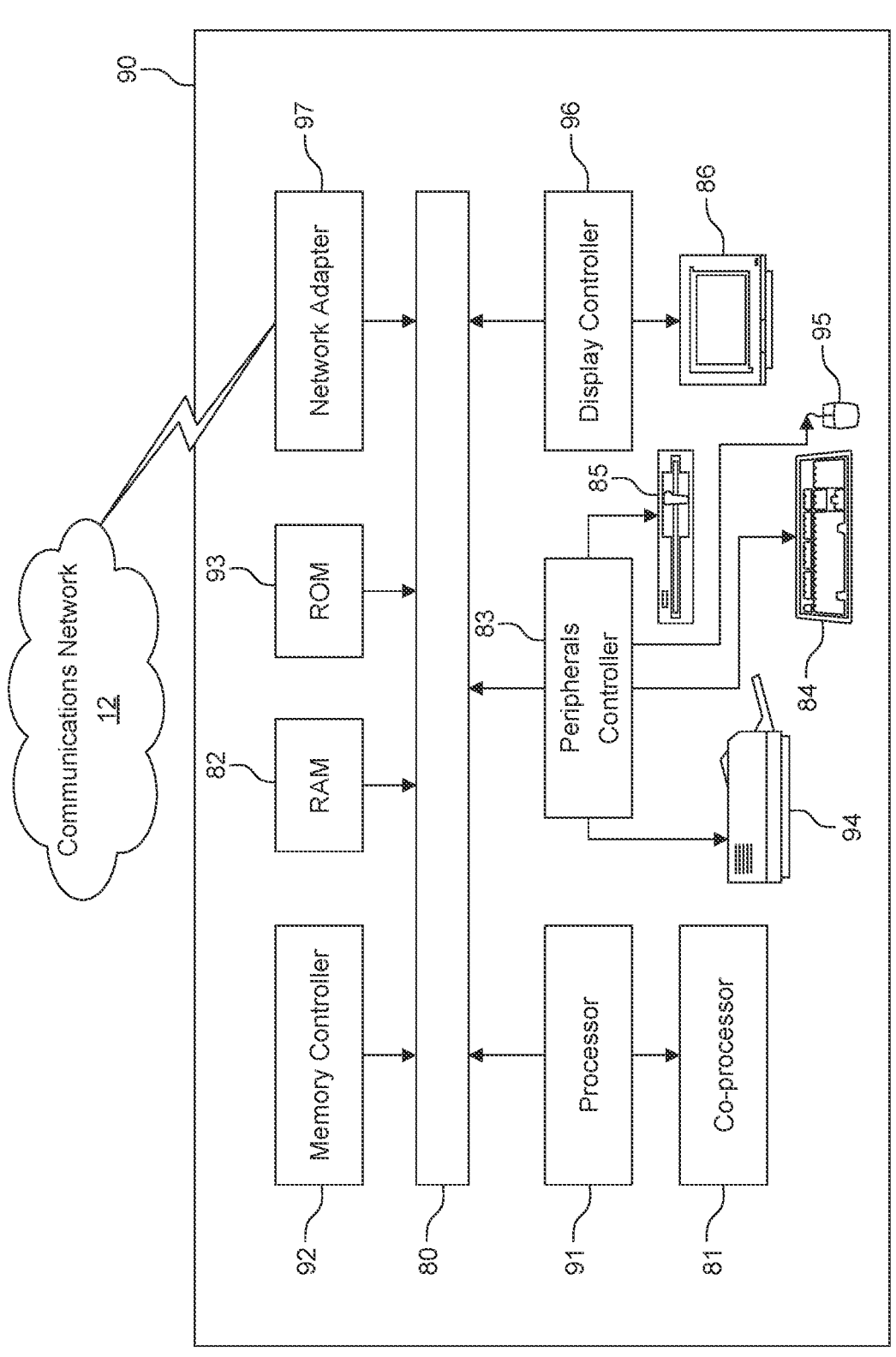
FIG. 15G is a block diagram of an exemplary computing system.

FIG. 15G is a block diagram of an exemplary computing system 90 in which one or more apparatuses of the communications networks illustrated in FIG. 15A, FIG. 15C, FIG. 15D and FIG. 15E as well as enhanced edge application relocation, such as the systems and methods illustrated in FIG. 1 through FIG. 14 described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for triggering, such as receiving triggering message over the control plane.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 15A, FIG. 15B, FIG. 15C, FIG. 15D, or FIG. 15E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—enhanced edge application relocation—as illustrated in the Figures, specific terminology is employed for the sake of clarity. The claimed subject matter, however, is not intended to be limited to the specific terminology so selected.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples for the disclosed subject matter, including the best mode, and also to enable any person skilled in the art to practice the disclosed subject matter, including making and using any devices or systems and performing any incorporated methods. The disclosed subject matter may include other examples that occur to those skilled in the art (e.g., skipping steps, combining steps, or adding steps between exemplary methods disclosed herein).

Methods, systems, and apparatuses, among other things, as described herein may provide for enhancing edge application relocation. A method, system, computer readable storage medium, device, among other things, as described herein may provide for maintaining a neighbor list for an edge node consisting of information of the other edge nodes with which an edge application server relocation may be performed; determining that there is a potential relocation for an edge application server; collecting information related to the potential relocation; determining the type of the potential relocation; and based on the relocation event type, selecting one or more candidate edge nodes as the relocation targets. A method, system, computer readable storage medium, device, among other things, as described herein may provide for defining relocation trigger criteria or pre-relocation operations based on the relocation event type, the information of the application client and EAS, or the status of candidate edge nodes; obtaining information of the candidate edge nodes, based on which, trimming the list of candidates; and monitoring the requirements of the application client, the status of the edge application server or candidate edge nodes to detect the relocation trigger; sending a proactive relocation request to each of the candidate edge nodes; performing application relocation when triggered; or notifying candidate nodes that are not selected as the relocation target. The SCA may be a logical entity and perform the aforementioned steps. Status of an edge application here may correspond to the "application information" element of Table 4, which may include the requirements of the application client and other information that may be used for preparing/performing the relocation. Performance measurement of the edge application may include the communication time between the UE and an edge node, computation or processing time of an application at an edge node, response time (the sum of communication time and processing time), etc. More detailed descriptions could be found in Table 3. More than one edge node may be selected as candidate. An edge node may become qualified or disqualified dynamically. All combinations in this paragraph (including the removal or addition of steps) are contemplated in a manner that is consistent with the other portions of the detailed description.

Methods, systems, and apparatuses, among other things, as described herein may provide for enhancing edge application relocation. A method, system, computer readable storage medium, device, among other things, as described herein may provide for determining trigger criteria for relocation of servicing an edge application of a third apparatus from a first edge application server to a second edge application server, wherein the first edge application server is hosted on a second apparatus and the second edge application server is hosted on a fourth apparatus; selecting the fourth apparatus with which the relocation of servicing the edge application of the third apparatus could be performed; receiving one or more messages from at least one of the second apparatus, the third apparatus, or the fourth apparatus, the messages comprising information related to the relocation of servicing the edge application of the third apparatus; sending instructions to the fourth apparatus to perform actions regarding the relocation of servicing the edge application of the third apparatus; and based on the trigger criteria and the information related to the relocation of servicing the edge application of the third apparatus, scheduling the relocation of servicing the edge application of the third apparatus. The method may be executed by a first apparatus, wherein the first apparatus may be a UE, a serving edge node, or candidate edge node. The first apparatus may be the same as the second apparatus, the third apparatus, or the fourth apparatus. The information related to the relocation of the servicing the edge application may include information of an edge application, information of the second apparatus, information of the third apparatus, information of the fourth apparatus, or a performance measurement of the edge application All combinations in this paragraph (including the removal or addition of steps) are contemplated in a manner that is consistent with the other portions of the detailed description.

What is claimed is:

1. An apparatus comprising one or more processors and memory storing instructions which, when executed by the one or more processors, cause the apparatus to:

determine trigger criteria for a service continuity event of an edge application to relocate from a first edge application server to a second edge application server, wherein the trigger criteria comprise one or more threshold measurements of one or more performance indicators associated with the edge application on one or more candidate edge nodes for relocation, and wherein the second edge application server is one of the one or more candidate edge nodes for relocation;

select the second edge application server to perform the service continuity event of the edge application;

receive one or more messages indicating information related to the service continuity event of the edge application; and based on the trigger criteria and the information related to the service continuity event, send instructions to the second edge application server to perform relocation associated with the service continuity event of the edge application.

2. The apparatus of claim 1, wherein the one or more threshold measurements of the one or more performance indicators associated with the edge application comprises processing time of the edge application.

3. The apparatus of claim 1, wherein the information related to the service continuity event of the edge application comprises one or more indications of candidates for a potential relocation.

4. The apparatus of claim 1, wherein the instructions, when executed by the one or more processors, further cause the apparatus to:

send a proactive service continuity request to a service continuity assistance (SCA) server.

5. The apparatus of claim 1, wherein the instructions, when executed by the one or more processors, further cause the apparatus to:

manage status of the service continuity event.

6. The apparatus of claim 1, the operations further comprising performing application relocation with a service continuity assistance (SCA) server when triggered.

7. The apparatus of claim 1, wherein the instructions, when executed by the one or more processors, further cause the apparatus to:

select a third edge application server to be a candidate edge node that can perform the service continuity event of the edge application.

8. The apparatus of claim 1, wherein the instructions, when executed by the one or more processors, further cause the apparatus to:

determine if the service continuity event will be performed based on the information related to the service continuity event of the edge application.

9. The apparatus of claim 1, wherein the instructions, when executed by the one or more processors, further cause the apparatus to:

notify the second edge application server that the service continuity event will not be performed with the second edge application server.

10. A method comprising:

determining trigger criteria for service continuity event of an edge application to relocate from a first edge application server to a second edge application server, wherein the trigger criteria comprise one or more threshold measurements of one or more performance indicators associated with the edge application on one or more candidate edge nodes for relocation, and wherein the second edge application server is one of the one or more candidate edge nodes for relocation;

selecting the second edge application server to perform the service continuity event of the edge application;

receiving one or more messages indicating information related to the service continuity event of the edge application; and based on the trigger criteria and the information related to the service continuity event, sending instructions to the second edge application server to perform relocation associated with the service continuity event of the edge application.

11. The method of claim 10, wherein the one or more threshold measurements of the one or more performance indicators associated with the edge application comprises processing time of the edge application.

12. The method of claim 10, wherein the information related to the service continuity event of the edge application comprises one or more indications of candidates for a potential relocation.

13. The method of claim 10, further comprising:

sending a proactive service continuity request to a service continuity assistance (SCA) server.

* * * * *